United States Patent [19]
Sakamoto

[11] Patent Number: 5,367,384
[45] Date of Patent: Nov. 22, 1994

[54] METHOD OF AND APPARATUS FOR GENERATING HALFTONE DOTS

[75] Inventor: Takashi Sakamoto, Kamikyo, Japan

[73] Assignee: Dainippon Screen Mfg. Co., Ltd., Kyoto, Japan

[21] Appl. No.: 953,355

[22] Filed: Sep. 30, 1992

[30] Foreign Application Priority Data

Oct. 24, 1991 [JP] Japan .................................. 3-306954
Feb. 26, 1992 [JP] Japan .................................. 4-075159

[51] Int. Cl.$^5$ ............................................. H04N 1/40
[52] U.S. Cl. .................................. 358/456; 358/448; 358/455
[58] Field of Search ............... 358/443, 445, 447, 448, 358/454, 455, 456, 457, 459, 460, 429, 533, 534, 535, 536

[56] References Cited

U.S. PATENT DOCUMENTS

| | | |
|---|---|---|
| 4,499,489 | 2/1985 | Gall et al. . |
| 4,543,613 | 9/1985 | Sakamoto . |
| 4,673,971 | 6/1987 | Ikuta et al. . |
| 4,977,464 | 12/1990 | Ikuta ................................ 358/456 |

FOREIGN PATENT DOCUMENTS

52-49361 12/1977 Japan .

*Primary Examiner*—Edward L. Coles, Sr.
*Assistant Examiner*—Thomas D. Lee
*Attorney, Agent, or Firm*—Lowe, Price, LeBlanc & Becker

[57] ABSTRACT

The present invention produces halftone dots which shows small fluctuations in area irrespective of variation of the relative position of the address range of screen pattern data against the pixels. a plurality of exposure-decision points RC, SP1, SP2, and SP3 are set for each pixel RP. Screen pattern data is compared with an image signal at each of the exposure-decision points, and the results of comparison are output as preliminary decision value. The preliminary decision value is summed up to make total value Tex for each pixel, and the total value Tex is further accumulated in a primary scanning direction U to make total-sum value $\Sigma$Tex. When the total-sum value $\Sigma$Tex for a pixel is equal to or greater than the number of exposure-decision points, the pixel is determined to be exposed, and carry-over data Dco, which is obtained by subtracting the number of the exposure-decision points from the total-sum value $\Sigma$Tex, is transferred to the next pixel. When the total-sum value $\Sigma$Tex for a pixel is less than the number of the exposure-decision points, the pixel is determined not to be exposed, and the total-sum value $\Sigma$Tex is transferred to the next pixel as the carry-over data Dco.

18 Claims, 23 Drawing Sheets

θ = 0°

θ = 15°

θ = 45°

θ = 75°

Din = 0

Din = 1

Din = 2

Din=0

Din=1

Din=2

Fig. 11(d) Din=1

Fig. 11(e) Din=2

Din = 0

Din = 1

Din = 2

Fig. 16(a)
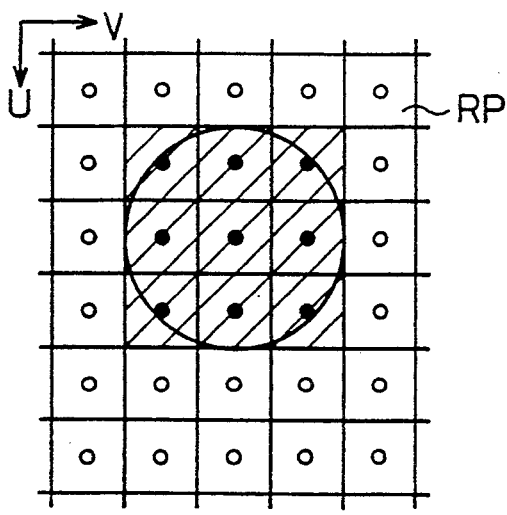
Fig. 16(b)
Fig. 16(c)
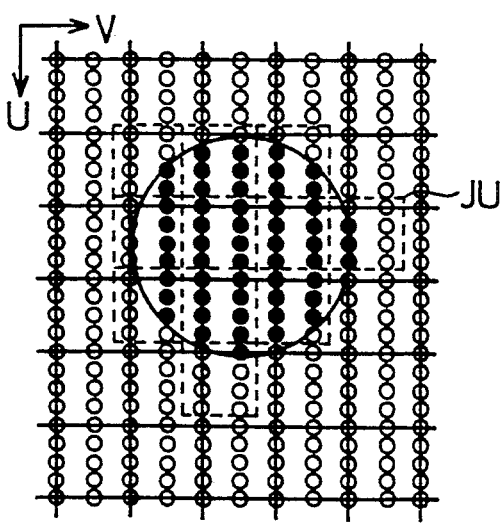
Din = 0
Fig. 16(d)
Fig. 16(e)
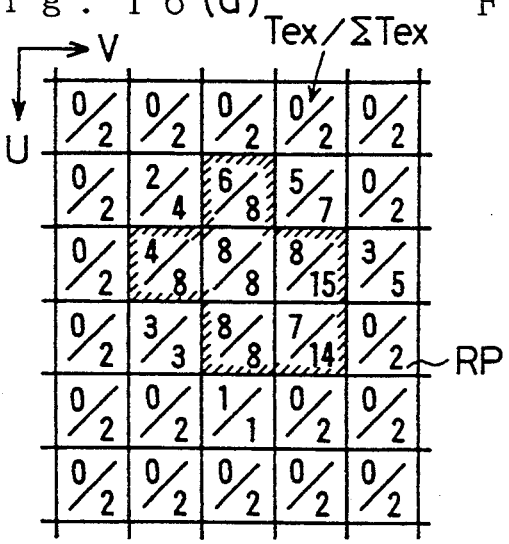
Din = 1
Din = 2

Fig. 17(a)
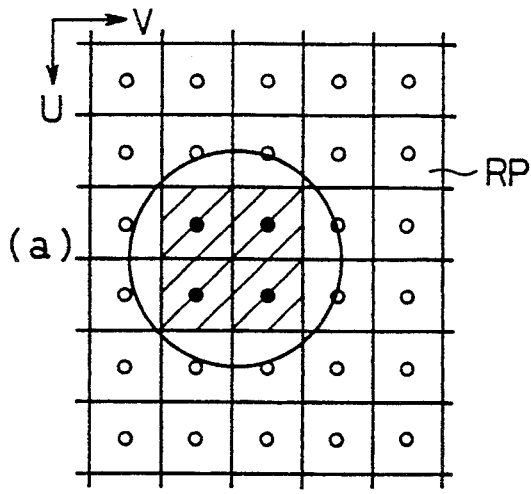
Fig. 17(b)
Fig. 17(c)
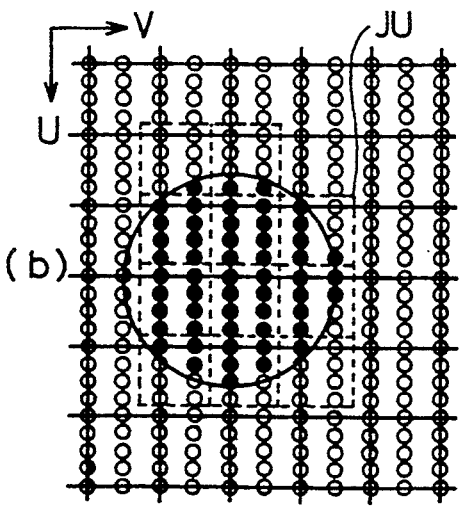
Fig. 17(d)
Fig. 17(e) Din = 0
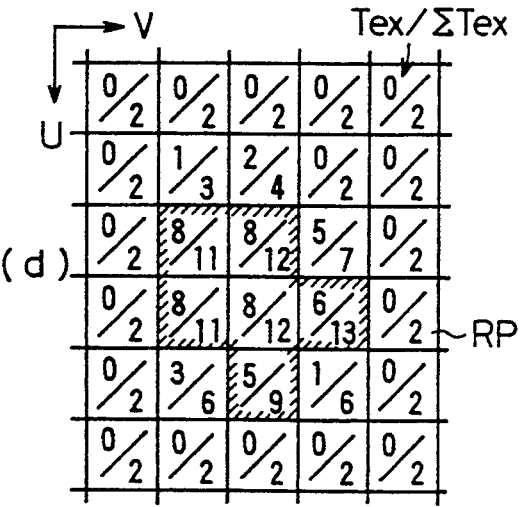
Din = 1
Din = 2

Nex = 4
Din = 0

Fig. 20(a)
|   | 4/5 | 4/5 | 4/5 | 4/5 | 4/5 | 4/5 | 4/5 | 4/5 |
|---|---|---|---|---|---|---|---|---|
|   | 4/5 | 4/5 | 1/2 | 0/1 | 2/3 | 4/5 | 4/5 | 4/5 |
|   | 4/5 | 2/3 | 0/2 | 0/1 | 0/3 | 0/1 | 2/3 | 4/5 |
|   | 2/3 | 0/3 | 0/2 | 0/1 | 0/3 | 0/1 | 1/4 | 4/5 |
|   | 4/5 | 0/3 | 0/2 | 0/1 | 0/3 | 0/1 | 1/1 | 4/5 |
|   | 4/5 | 1/4 | 0/2 | 0/1 | 0/3 | 2/3 | 3/4 | 4/5 |
|   | 4/5 | 3/3 | 2/4 | 0/1 | 2/5 | 4/5 | 4/5 | 4/5 |
|   | 4/5 | 4/5 | 4/5 | 4/5 | 4/5 | 4/5 | 4/5 | 4/5 |
Nex = 4
Din = 1
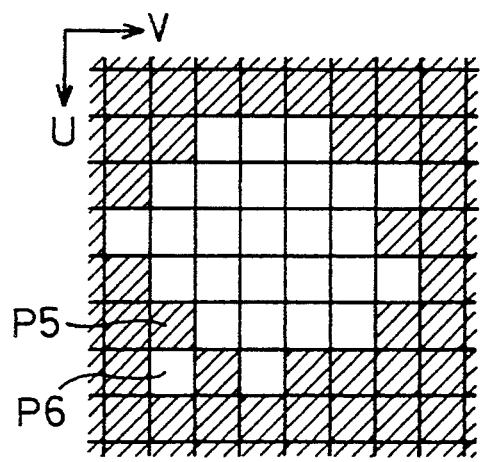
Fig. 20(b)
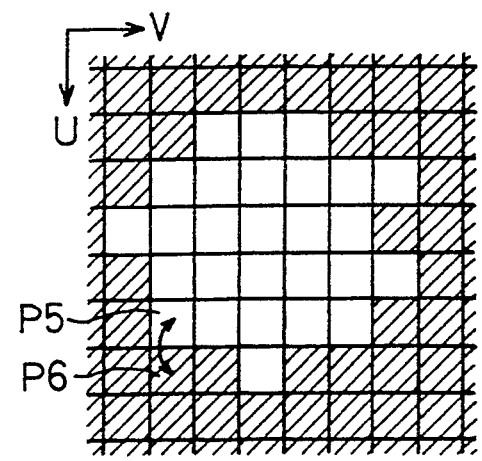
Fig. 20(c)

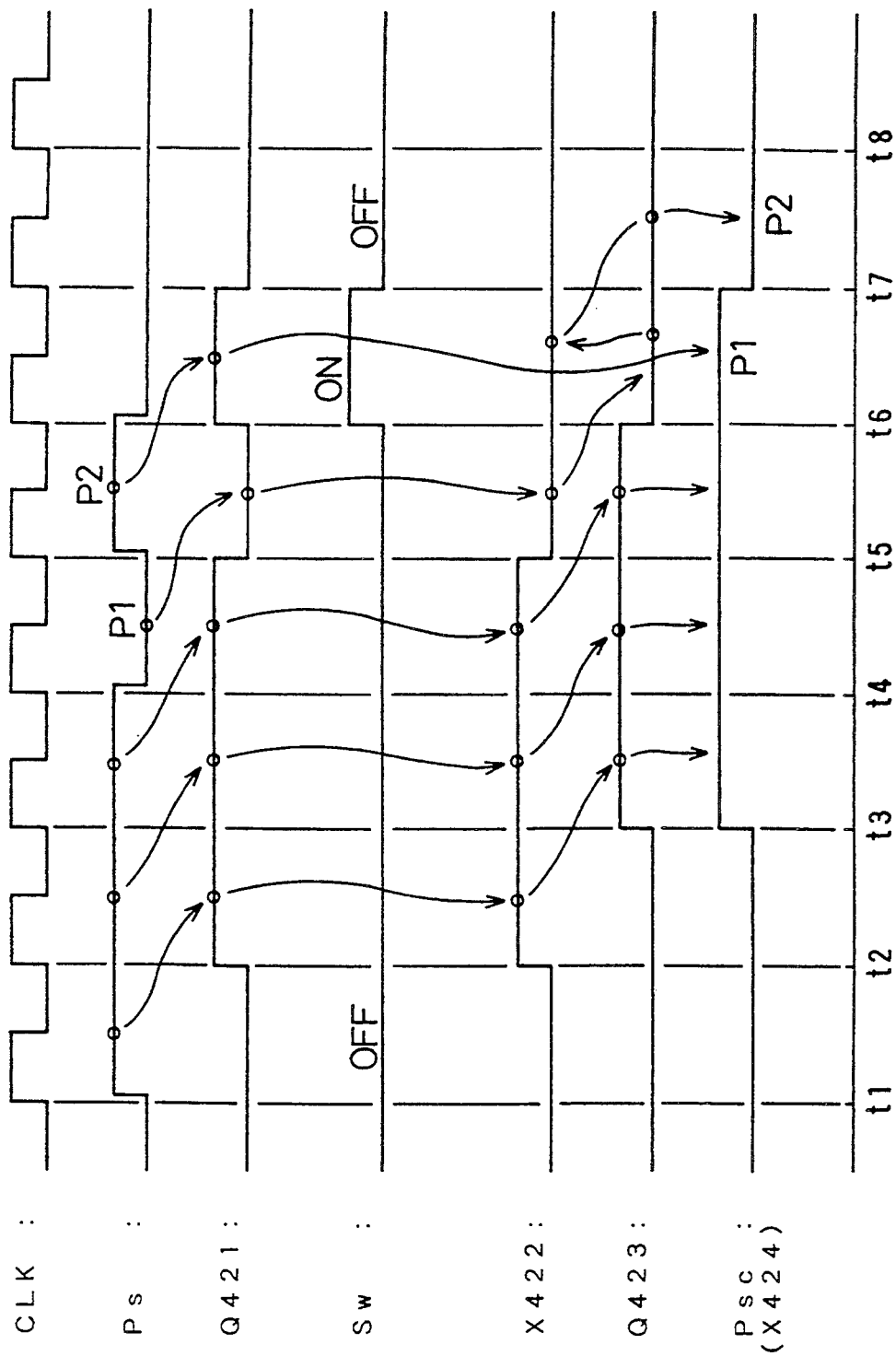

METHOD OF AND APPARATUS FOR GENERATING HALFTONE DOTS

BACKGROUND OF THE INVENTION

1. Field of the Invention

The present invention relates to a method of and an apparatus for generating halftone dots to reproduce a halftone image.

2. Description of the Related Art

In printing process, halftone images of four primary colors, that is, yellow (Y), magenta (M), cyan (C), and black (K), are printed with respective inks on a printing sheet to produce a color print. Each halftone image includes a large number of halftone dots which represent density variation in the image, and each halftone dots includes a number of painted pixels. The larger the number of painted pixels in a halftone dot, the larger the halftone dot; the larger the halftone dots, the darker the halftone image becomes.

The halftone image on the film is generally produced with a scanner which includes a reading unit for reading an original color image to generate color separation image signals, and a recording unit for exposing a photosensitive film to reproduce halftone images on the film. The color separation image signals represent density variations of the respective four primary colors in the original color image. The recording unit compares each image signal with specific screen pattern data, which represent threshold values, to generate a control signal for each recording pixel as a result of the comparison, and exposes a halftone image on a photosensitive film while ON-OFF controlling a light beam in response to the control signal.

FIG. 1 shows an example of screen pattern data for one halftone dot region. In this specification, one halftone dot region corresponds to one halftone dot. In FIG. 1, one halftone dot region is made of $32 \times 32$ pixels to each which a threshold value ranging from 0 through 255 is assigned. The threshold value for each pixel is compared with the level of the image signal, and those pixels that have the threshold values less than the level of the image signal are to be exposed. For example, when the level of the image signal is 64 over the $32 \times 32$ pixels, the area shaded at its outline is exposed to make a halftone dot.

The superimposed four halftone images could cause the so-called "moire" in the color print. The orientation angles or screen angles of the four halftone images are therefore set at different values to prevent the moire. FIGS. 2(a) through 2(d) show dot arrangements where the screen angles 74 are set at 0 degrees, 15 degrees, 45 degrees, and 75 degrees, respectively.

The production of four dot arrangements with different screen angles $\theta$ can be executed by two typical methods, that is, the rational tangent method and the irrational tangent method. The tangent of each screen angle $\theta$ ($\tan\theta$) is set at a rational number in the rational tangent method, and it is set at an irrational number in the irrational tangent method.

FIG. 3 is a conceptive view illustrating an arrangement of screen pattern data for the screen angle $\theta$ of about fifteen degrees according to the rational tangent method. FIG. 3 includes four halftone dot regions. U denotes a primary scanning direction and V denotes a secondary scanning direction. According to the rational tangent method, screen pattern data is produced such that the screen pattern data is addressed along each primary scanning line. For example, when a first halftone dot region HD1 and a second halftone dot region HD2 are exposed along a scanning line SL, the screen pattern data along the scanning line SL are successively read out. The rational tangent method therefore requires four sets of screen pattern data for the four screen angles so that the screen pattern data is addressed along the primary scanning line at each screen angle.

It is sometimes required to change of a screen ruling, or the number of halftone dots per inch, of the halftone image. The screen ruling is changed by adjusting a diameter and an interval of luminous points on the photosensitive film in the rational tangent method. This, however, requires a complicated shuttle mechanism in the secondary scanning direction, and an expensive optical system which can change the diameter and interval of the luminous points.

The irrational tangent method, on the other hand, can change the screen ruling relatively easily. Screen pattern data used in the irrational tangent method includes threshold values which are assigned to pixels in one halftone dot region as shown in FIG. 1. FIG. 4 illustrates application of the screen pattern data in the irrational tangent method. In FIG. 4, X and Y coordinates axes denote addresses on a screen pattern memory, or a memory for storing screen pattern data, and U and V denote primary and secondary scanning directions, respectively. The coordinates (U, V) of an arbitrary point A in the U-V coordinate system are converted to the coordinates of the X-Y coordinate system as follows to make the address on the screen pattern memory:

$$Y = U*\cos\theta - V*\sin\theta \tag{1a}$$

$$Y = U*\sin\theta + V*\cos\theta \tag{1b}$$

where "*" denotes multiplication. When $U = m*p$ and $V = n*p$, the equations (1a) and (1b) are rewritten as follows:

$$X = m*p*\cos\theta - n*p*\sin\theta \tag{2a}$$

$$Y = m*p*\sin\theta + n*p*\cos\theta \tag{2b}$$

where "m" and "n" are integers and "p" denotes a pitch of each recording pixel, or a side length of each recording pixel.

Since the subscanning coordinate value v is constant on each primary scanning line, the integer- "n" is also constant on each scanning line. Therefore, only the first terms of the equations (2a) and (2b) change in reading out the screen pattern memory along the scanning line. According to the equations (2a) and (2b), one-pixel progress in the primary scanning direction increases the X coordinate by $p* \cos\theta$ and the Y coordinate by $p* \sin\theta$. The screen pattern data for one halftone dot region as shown in FIG. 1 is sufficient to produce halftone dot arrangements at four different screen angles accordingly. Furthermore, the screen ruling is also changeable by adjusting the pixel pitch p in the irrational tangent method.

FIG. 5 shows the relationship between the arrangement of recording pixels and the address on the screen pattern memory in the irrational tangent method. Here, recording pixels RP are disposed along scanning lines SL. The coordinates (U, V) of each recording pixel in the scanning coordinate system are converted to the coordinates (X, Y) in the address coordinate system to make the address on the screen pattern memory according to the above equations (2a) and (2b). In the example of FIG. 5, screen pattern data stored at the address (0, 0), (2, 1), and (3, 1) are read out when recording pixels RP on a first scanning line SL1 are to be exposed. In a similar manner, when recording pixels RP on a second scanning line SL2 are to be exposed, screen pattern data stored at the address (0, 2) and (1, 2) are read out. In the irrational tangent method, the address on the screen pattern memory does not go along the primary scanning direction U, and some addresses on the screen pattern memory are skipped. The plural addresses which are referred to in a certain halftone dot region is generally different from those in adjacent halftone dot regions.

Since part of the addresses on the screen pattern memory are skipped in the irrational tangent method, the size of a halftone dots to be exposed, that is, the number of pixels in the halftone dots, deviate even if those halftone dots are produced as a function of an image signal of a constant level. FIGS. 6(a) and 6(b) show examples of halftone dot generation as a function of an image signal with a fixed level. A polygonal region Rex defined by bold lines represents the address range of screen pattern data which are smaller than the level of the image signal, that is, the address range to be exposed. The address of the screen pattern data corresponds to the center of each recording pixel RP. Each recording pixels are defined by a square in FIGS. 6(a) and 6(b), and each pixel center is drawn by a closed circle or an open circle. The recording pixels whose center is included in the polygonal region Rex are determined to be exposed, while the recording pixels whose center is not included therein are determined not to be exposed. The centers of the exposed pixels are shown with closed circles, and the exposed pixels are shaded. Nine recording pixels RP are exposed in FIG. 6(a), and four pixels in FIG. 6(b).

As described above, in the irrational tangent method, variation in the relative positions of the addresses to be referred to causes fluctuations in area of the halftone dots. In other words, halftone dots which are produced as a function of an image signal of a constant level do not have the same area. The variation in the relative position increases the darkness in some image areas while increasing the lightness in other image areas, thus causing uneven and unstable image reproduction.

Several methods have been proposed to eliminate the unevenness of a reproduced image. There is a method which applies a table of random digits to the address. This method, however, deforms halftone dots. Another method shifts or distorts each halftone dot region at random. The second method, however, could not efficiently eliminate fluctuations in area. There is still another method which changes the distribution of light quantity of a light beam. The third method, however, requires a relatively complicated optical system for changing the light quantity of the light beam.

SUMMARY OF THE INVENTION

An object of the present invention is to eliminate undesirable fluctuations in halftone dot area caused by variation in the positions of the address range of screen pattern data relative to recording pixels.

The above and other related objects are realized by an improved method of generating dots consisting of plural recording pixels corresponding to a given image signal. The method of the present invention for generating halftone dots each consisting of a plurality of pixels as a function of a given image signal, comprises the steps of: (a) preparing a screen pattern memory for memorizing threshold values arranged in a predetermined matrix in a Cartesian X-Y coordinate system; (b) arranging pixels at lattice points in a Cartesian U-V coordinate system, the U and V denoting a primary scanning direction and a secondary scanning direction, respectively, the U-V coordinate system being set in predetermined relation to the X-Y coordinate system; (c) setting a predetermined number Nex of exposure-decision points for each pixel in the U-V coordinate system, the number Nex being an integer more than one; and (d) determining whether or not to expose each pixel.

The step (d) includes the steps of: (d-1) converting U-V coordinates of each of the number Nex of the exposure-decision points for each pixel to X-Y coordinates; (d-2) reading out the threshold values according to the X-Y coordinates of the number Nex of the exposure-decision points from the screen pattern memory; (d-3) comparing the threshold values for the number Nex of the exposure-decision points with the image signal to thereby produce a preliminary decision value indicating the result of the comparison at each of the exposure-decision points; (d-4) summing up the preliminary decision value over the number Nex of the exposure-decision points to make a total value for each pixel; and (d-5) accumulating the total value over a plurality of the pixels in the primary scanning direction U in order of scanning to thereby make a total-sum value for each pixel, and determining whether or not to expose each pixel according to the total-sum value.

According to the above method, the total value for each pixel is used as a basis of determining whether or not to expose each pixel. The present method can thus determine exposure or non-exposure more accurately and precisely than the conventional method. Use of the total-sum value allows comprehensive exposure or non-exposure determination for a plurality of pixels disposed in the primary scanning direction. Even when the relative position of the address range in the screen pattern memory varies against the coordinates of pixels, the present method can efficiently reduce fluctuations on in the number of pixels to be exposed. Consequently, undesirable fluctuations in the halftone dot area due to variation of the relative position can be reduced.

According to an aspect of the present invention, the exposure-decision points for each pixel include a central point of each pixel and at least one supplemental point, the central point and the supplemental point forming a lattice whose lattice lines are parallel to the primary scanning direction and the secondary scanning direction.

Preferably, the step (d-3) comprises the step of: setting the preliminary decision value equal to one when the comparison indicates to expose a current pixel, and equal to zero when the comparison indicates not to expose the current pixel; and the step (d-5) comprises the step of: determining to expose the current pixel and carrying over a value obtained by subtracting the number Nex from the total-sum value to a next pixel to be accumulated with the total value on condition the the total-sum value for the current pixel is no less than the number Nex; and determining not to expose the current pixel and carrying over the total-sum value to the next pixel to be accumulated with the total value on condition the the total-sum value for the current pixel is less than the number Nex.

In the preferred embodiment, the step (d-5) further comprises the step of: carrying over a predetermined initial value to the next pixel to be accumulated with the total value on condition the the level of the image signal is less than fifty percent in halftone dot area rate and the the total value is equal to zero, the initial value being smaller than the number Nex; and carrying over the initial value to the next pixel to be accumulated with the total value on condition the the level of the image signal is no less than fifty percent in halftone dot area rate and the the total value is equal to the number Nex.

Alternatively, the step (d-5) comprises the step of: carrying over a predetermined initial value to a next pixel to be accumulated with the total value on condition the the level of the image signal is less than fifty percent in halftone dot area rate, and the at least one of X coordinate and Y coordinate of a predetermined representative point selected from the exposure-decision points exceeds a first value corresponding to all end of a halftone dot region, the initial value being smaller than the number Nex; and carrying over the initial value to the next pixel to be accumulated with the total value on condition the the level of the image signal is not less than fifty percent in halftone dot area rate, and the at least one of the X coordinate and the Y coordinate of the representative point exceeds a second value corresponding to the center of the halftone dot region.

Further, the step (d-5) comprises the step of: holding a result of determination of whether or not to expose a preceding pixel preceding the current pixel.; exchanging the results of the determination between the current pixel and the preceding pixel on condition the the level of the image signal is less than fifty percent in halftone dot area rate, and the the total value of the current pixel is an integer between a predetermined first reference value and one, and the the current pixel is determined to be exposed; and exchanging the results of the determination between the current pixel and the preceding pixel on condition the the level of the image signal is not less than fifty percent in halftone dot area rate, and the the total value of the current pixel is an integer between a predetermined second reference value and (Nex-1), and the the current pixel is determined not to be exposed.

Preferably, the initial value is an integer between (Nex/2−1) and (Nex/2+1).

The present invention is also directed to an apparatus for generating halftone dots each consisting of a plurality of pixels arranged in a Cartesian U-V coordinate system as a function of a given image signal, the apparatus including a screen pattern memory for memorizing threshold values arranged in a predetermined matrix in a Cartesian X-Y coordinate system, the U and V denoting a primary scanning direction and a secondary scanning direction, respectively, the U-V coordinate system being set in predetermined relation to the X-Y coordinate system. The apparatus comprises: conversion means for converting U-V coordinates of each of a predetermined number Nex of exposure-decision points to X-Y coordinates, the exposure-decision points being assigned to each pixel in the U-V coordinate system, the number Nex being an integer more than one; reading means for reading out the threshold values according to the X-Y coordinates of the number Nex of the exposure-decision points from the screen pattern memory; comparing means for comparing the threshold values for the number Nex of the exposure-decision points with the image signal to thereby produce a preliminary decision value indicating the result of the comparison at each of the exposure-decision points; summation means for summing up the preliminary decision value over the number Nex of the exposure-decision points to make a total value for each pixel; and accumulation means for accumulating the total value over a plurality of the pixels in the primary scanning direction U in order of scanning to thereby make a total-sum value for each pixel, and determining whether or not to expose each pixel according to the total-sum value.

These and other objects, features, aspects, and advantages of the present invention will become more apparent from the following detailed description of preferred embodiments with the accompanying drawings.

BRIEF DESCRIPTION OF THE DRAWINGS

FIGS. 11(a) through 11(e) schematically illustrate determination process of exposure when the dot percent is no less than fifty percent;

FIGS. 16(a) through 16(e) schematically illustrate determination process of exposure of each recording pixel using the exposure-decision points of FIG. 15;

FIGS. 17(a) through 17(e) schematically illustrate determination process of exposure of each recording pixel using the exposure-decision points of FIG. 15;

FIGS. 20(a) through 20(c) illustrate exchange of the results of exposure determination in the second embodiment when the dot percent is not less than fifty percent;

FIG. 23 is a timing chart showing operation of the signal holding element of FIG. 21.

DESCRIPTION OF THE PREFERRED EMBODIMENT

A. Exposure Decision in First Embodiment

Figure 7:
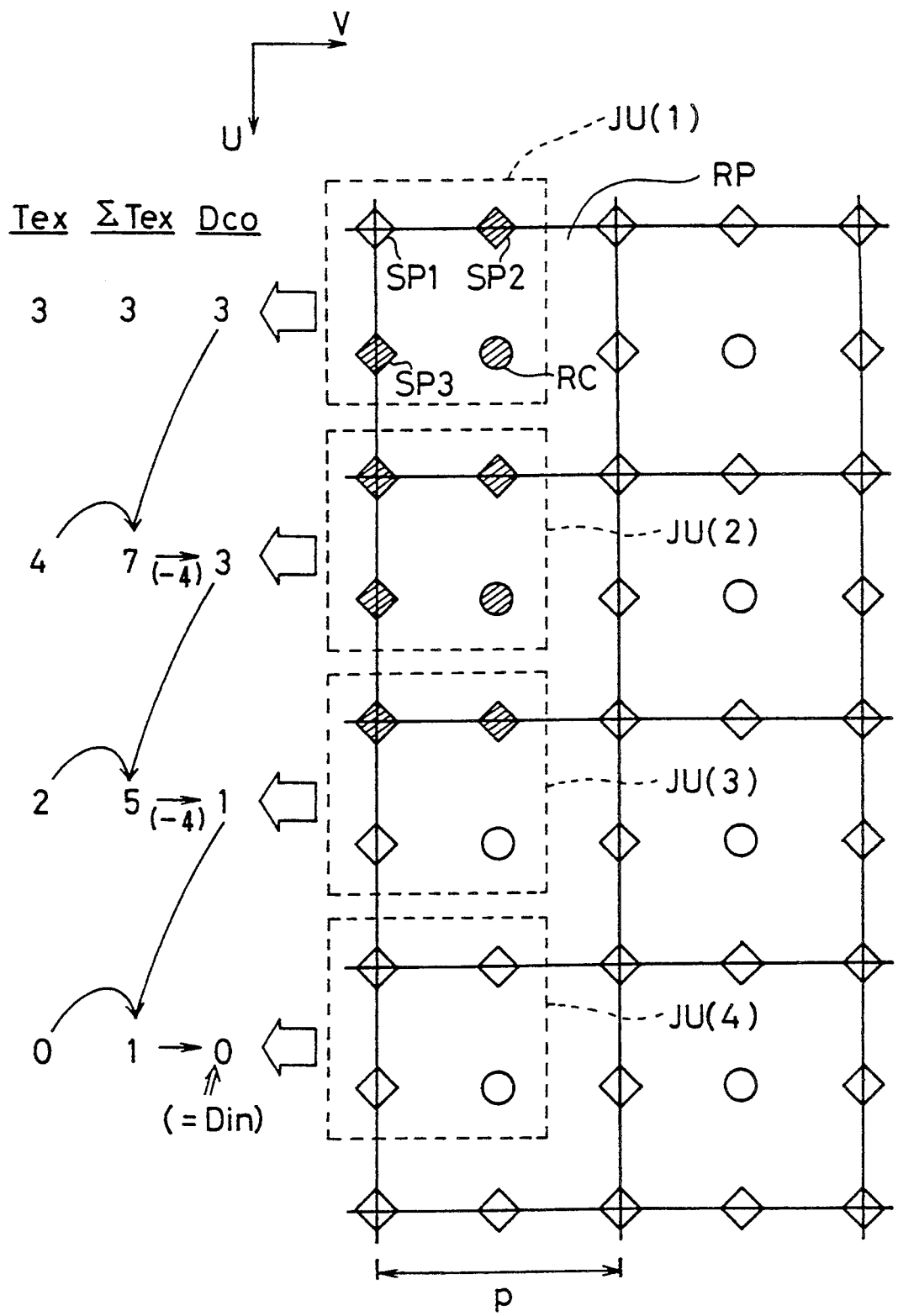
FIG. 7 shows an arrangement of exposed-decision points, which are used for determining exposure of each recording pixel.

FIG. 7 schematically illustrates a typical method of determining exposure or non-exposure of each recording pixel in a first embodiment of the invention.

In FIG. 7, a circle RC represents the center of each recording pixel RP and is hereinafter referred to as an exposure center, and rhombuses are sub-decision points. Each recording pixel RP is a square defined by solid lines of lattice. An exposure-decision unit JU is set in each recording pixel RP to include four exposure-decision points, that is, the exposure center RC and three sub-decision points SP1, SP2, and SP3. Exposure or non-exposure of each recording pixel RP is determined according to the results of decision at the four exposure-decision points in the respective exposure-decision unit JU. A predetermined number of exposure-decision points Nex in the exposure-decision unit JU are used to determine whether the pixel is to be exposed or not, as described later.

The exposure center RC is located at the center of a lattice, whose pitch "p" is equal to the side length of each recording pixel RP. The sub-decision points SP1, SP2, and SP3 are located at lattice points of a lattice whose pitch is half of the pitch "p".

Exposure or non-exposure of each recording pixel RP is determined as follows. First, screen pattern data Dsp is compared with the level of an image signal Sm at the four exposure-decision points RC, SP1, SP2, and SP3, respectively, and the value of preliminary decision data Dex is determined for each exposure decision point in the following manner:

when Dsp is less than Sm, Dex=1; (3a)

when Dsp is not less than Sm, Dex=0; (3b)

where Dex=1 and Dex=0 indicate to exposure and not to exposure, respectively. In FIG. 7, shaded circles and rhombuses are exposure-decision points where the preliminary decision data Dex is equal to one.

Then, the following values which are shown in the left column of FIG. 7 are calculated for each of the exposure-decision units JU(1) through JU(4):

(a) Total data Tex: summation of the preliminary decision data Dex at the four exposure-decision points.

(b) Total-sum data $\Sigma$Tex: a value obtained by accumulating the values of the total data Tex for exposure-decision units JU in a primary scanning direction U. The total-sum data is expressed as:

$$\Sigma Tex = Dco + Tex \quad (4)$$

where Dco is defined as follows.

(c) Carry-over data Dco: a value obtained by subtracting the number of exposure decision points Nex from the total-sum data $\Sigma$Tex when the total-sum data $\Sigma$Tex is equal to or greater than the number Nex; when the total-sum data $\Sigma$Tex is less than the number Nex, on the other hand, the $\Sigma$Tex is set at Dco. The carry-over data Dco is equal to 4 in this embodiment.

The value of the carry-over data Dco is set at zero for the fourth exposure-decision unit JU(4) in FIG. 7 for a certain reason which will be described later.

Pixels to be exposed have the total-sum data $\Sigma$Tex which is equal to or greater than the number of exposure-decision points Nex, while pixels not to be exposed have the total-sum data $\Sigma$Tex which is less than the number Nex. In the example of FIG. 7, the recording pixels RP of the second and the third exposure-decision units JU(2) and JU(3) are exposed accordingly.

The value of the carry-over data Dco for each recording pixel is transferred to the next recording pixel. Consequently, the number of recording pixels to be exposed over the primary scanning direction U becomes virtually equal to one fourth of the total of the preliminary decision data Dex. In the example of FIG. 7, the total of the preliminary decision data Dex is 9 for the four exposure-decision units JU(1) through JU(4). One fourth of the total value (9/4=2.25) is practically equal to the number of the recording pixels to be exposed (=2). Since the total of the preliminary decision data Dex is virtually proportional to the level of the image signal Sm, use of the carry-over data Dco allows to produce halftone dots having an area proportional to the level of the image signal Sm. Namely, this method sufficiently reduce fluctuations in halftone dot area.

The carry-over data Dco is set at an initial value Din (for example, Din=0) irrespective of the value of the total-sum data $\Sigma$Tex on the following condition (d1) or (d2):

Condition (d1): The level of the image signal Sm is less than fifty percent in the unit of halftone dot area rate, and Tex is equal to zero;

Condition (d2): The level of the image signal Sm is equal to or greater than fifty percent, and Tex is equal to Nex.

The carry-over data Dco is also set at the initial value Din at the starting point of each primary scanning line.

Figure 8:
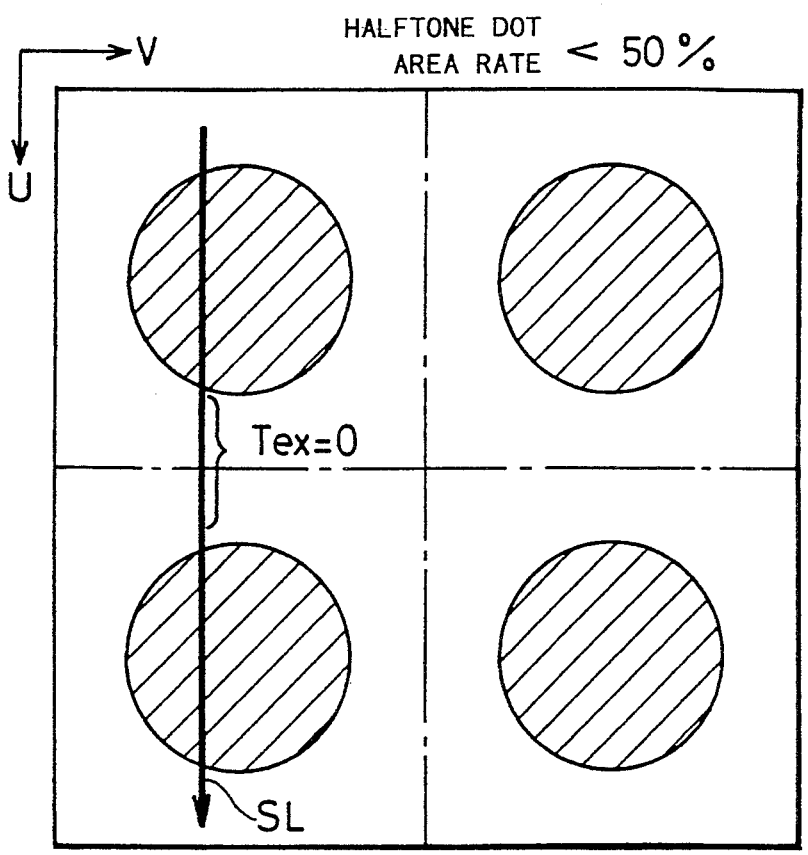
FIGS. 8(a) and 8(b) show conditions for setting a predetermined initial value as carry-over data.
Figure 8:
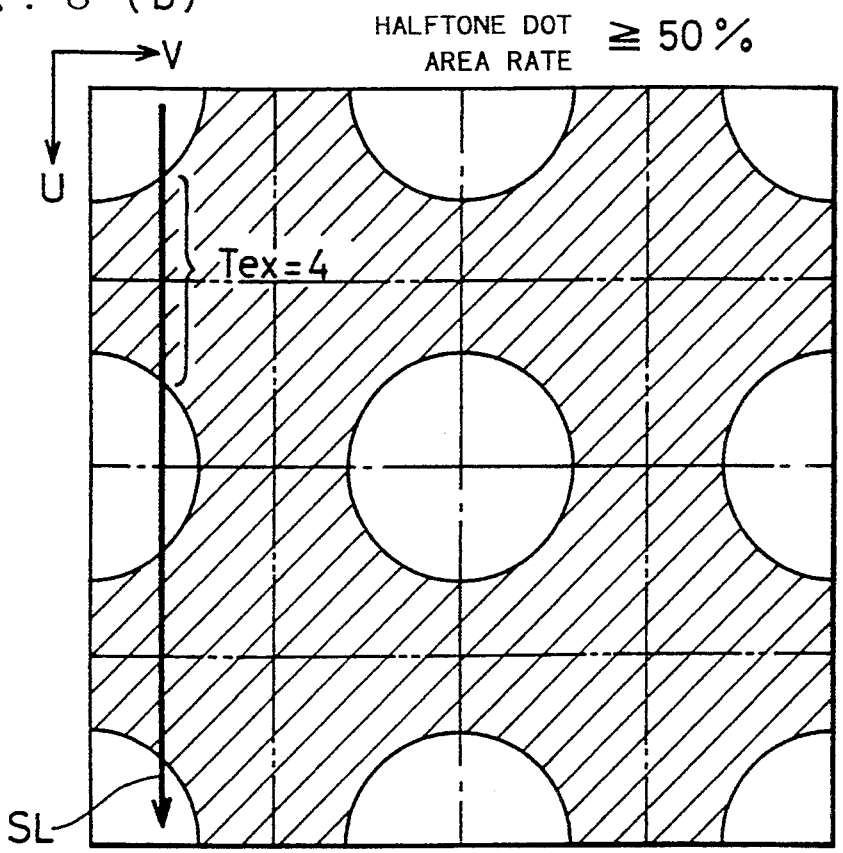

FIGS. 8(a) and 8(b) schematically illustrate examples of dot arrangement on the conditions (d1) and (d2), respectively. When the dot percent is less than fifty as shown in FIG. 8(a), exposed areas, which are shaded, are separated by non-exposed areas. When all of the four decision points of a exposure-decision unit are located in a non-exposed area, the total data Tex for the unit is equal to zero. In other words, at the position of the recording pixel whose total data Tex becomes equal to zero, an exposed area of one halftone dot is completed, and a non-exposed area between two exposed areas begins. Accordingly, when the condition (d1) is satisfied, the carry-over data Dco is set at the initial value Din. This prevents the value of the carry-over data Dco for one halftone dot, or an exposed area, from affecting exposure determination of the next halftone dot, and allows dot generation to maintain a dot percent proportional to the level of the image signal Sm.

When the dot percent is equal to or greater than fifty as shown in FIG. 8(b), on the other hand, non-exposed areas are separated by exposed areas. It is desirable to stabilize the shape of the non-exposed areas rather than stabilize the shape of the exposed areas in this case. When all of the four decision point of a exposure-decision unit are located in an exposed area, the total data Tex for the unit becomes equal to four. Accordingly, at the position of the recording pixel whose total data Tex becomes equal to four, that is, if the condition (d2) is satisfied, the carry-over data Dco is set at the initial value Din to prevent the value of the carry-over data Dco for one non-exposed area from affecting exposure determination of the next non-exposed area, and allows dot generation to maintain a dot percent proportional to the level of the image signal Sm.

FIGS. 9(a) through 9(e) and FIGS. 10(a) through 10(e) schematically illustrate exposure determination process when the dot percent is less than fifty percent.

Figure 6:
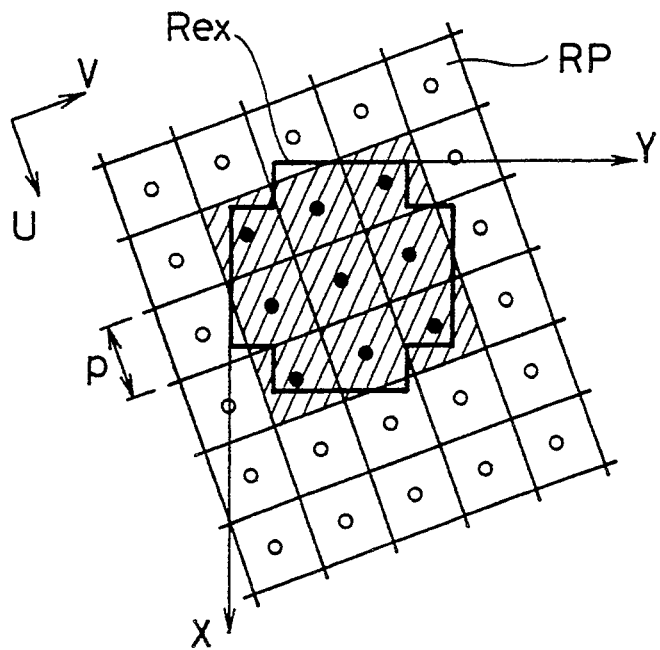
FIGS. 6(a) and 6(b) show examples of dot generation as a function of an image signal with a fixed level.
Figure 6:
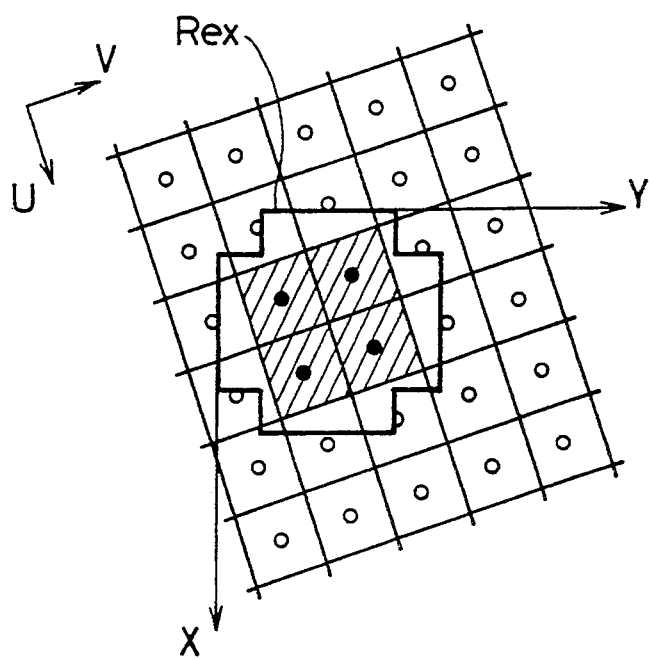
Figure 9A:
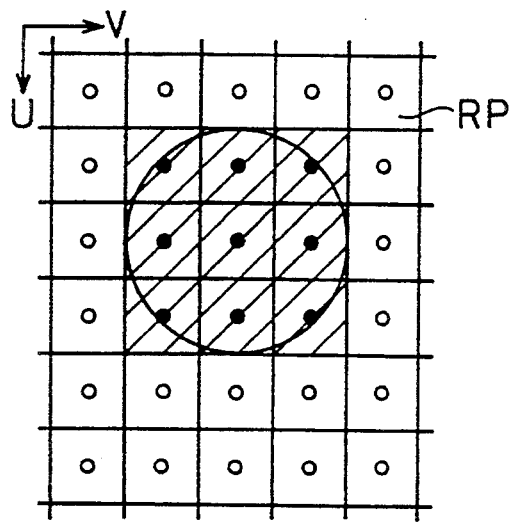
FIGS. 9(a) through 9(e) schematically illustrate determination process of exposure when the dot percent is less than fifty percent.

FIG. 9(a) is identical with FIG. 6(a), and it shows exposed pixels as a shaded area which are determined to be exposed according to the conventional method. The large circle in FIG. 9(a) shows the address range of screen pattern data which is smaller than the level of the image signal; in other words, the large circle in FIG. 9(a) corresponds to the polygonal region Rex in FIG. 6(a).

Figure 9B:
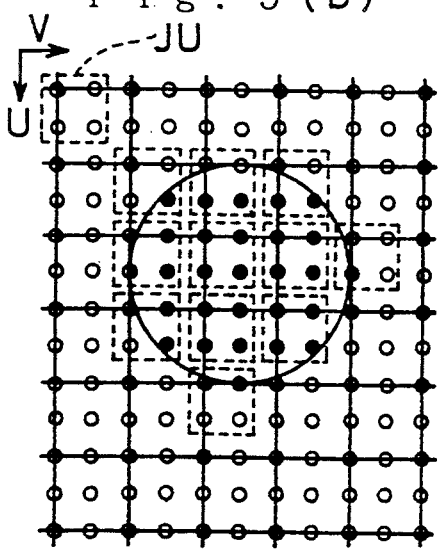

FIG. 9(b) shows a distribution of preliminary decision data Dex at the exposure-decision points according to the method of the embodiment for the same image signal and the same positional relation of screen pattern data as FIG. 9(a). In FIG. 9(b), all the exposure-decision points including the exposure center RC and the sub-decision points SP1 through SP3 (FIG. 7) are shown as small circles. Closed circles are the exposure-decision points at which Dex=1 while the open circles are those at which Dex=0. Areas defined by broken lines are exposure-decision units JU.

Figure 9C:
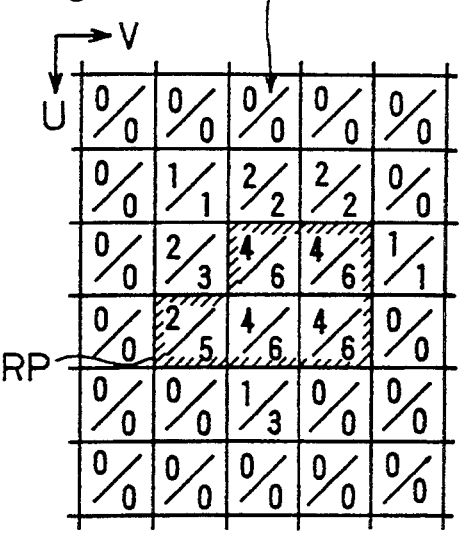
Figure 9D:
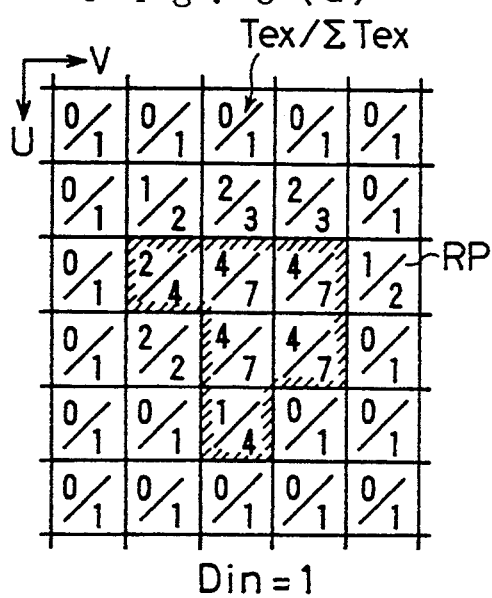
Figure 9E:
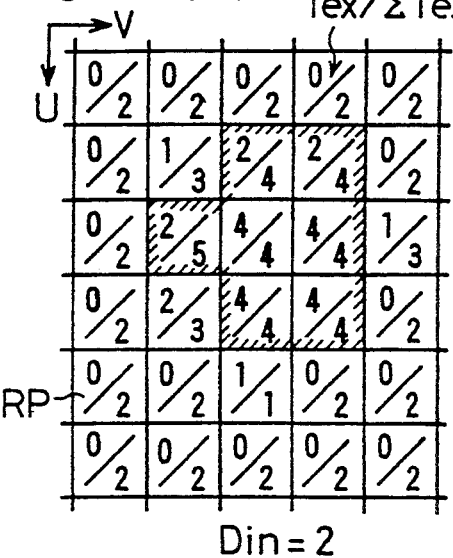

FIG. 9(c) shows the total data Tex and the total-sum data ΣTex for each recording pixel which are calculated from the preliminary decision data Dex of FIG. 9(b). Here, the initial value Din of the carry-over data Dco is set equal to zero. The recording pixels whose total-sum data ΣTex is no less than the number of exposure-decision points Nex (=4) are determined to be exposed. The area to be exposed, which is defined by slant lines, includes five recording pixels. FIG. 9(d) shows another result when the initial value Din is set equal to one, where six recording pixels are exposed. FIG. 9(e) shows still another result when the initial value Din is set equal to two, where seven recording pixels are exposed.

Figure 10A:
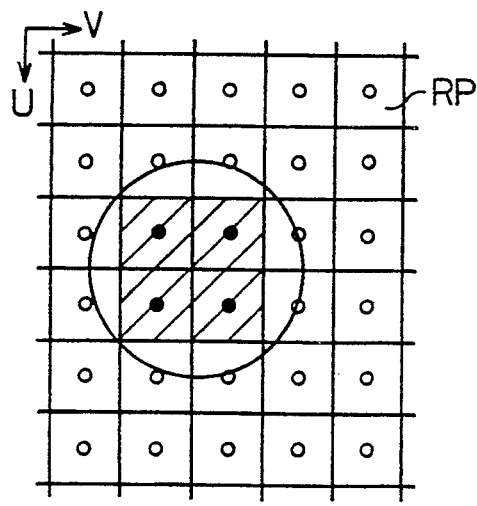
FIGS. 10(a) through 10(e) schematically illustrate determination process of exposure when the dot percent is less than fifty percent.
Figure 10B:
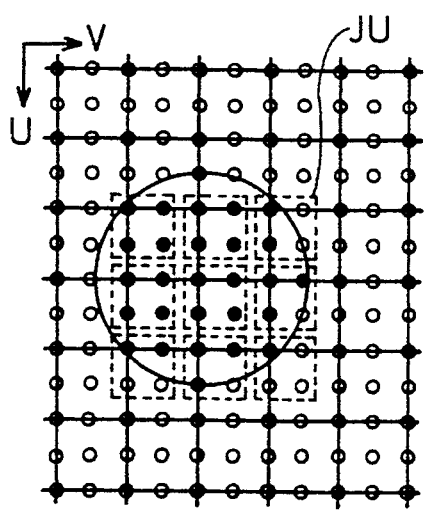
Figure 10C:
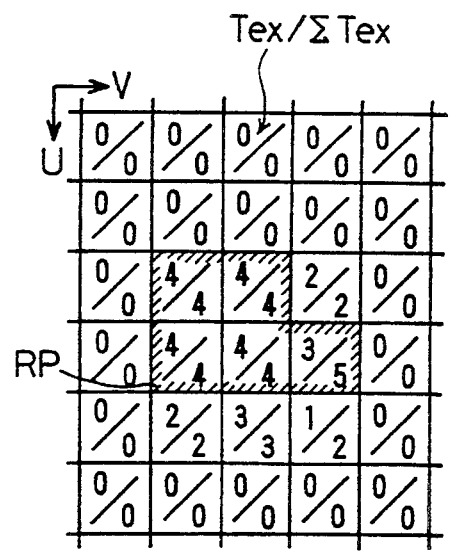
Figure 10D:
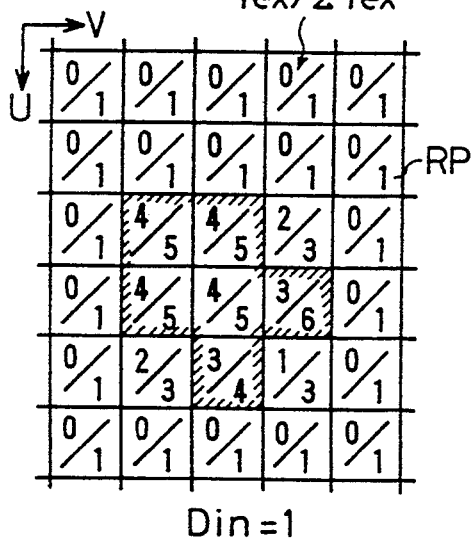
Figure 10E:
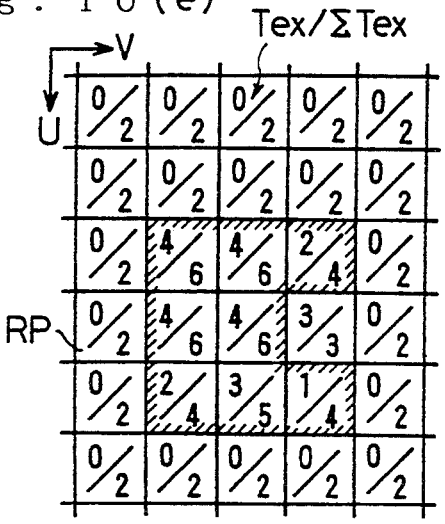

FIG. 10(a) is identical with FIG. 6(b), and it shows pixels to be exposed as a shaded area which are determined to be exposed according to the conventional method. FIG. 10(b) shows a distribution of preliminary decision data Dex at the exposure-decision points according to the method of the embodiment for the same image signal and the same positional relation of screen pattern data as FIG. 10(a). FIGS. 10(c) through 10(e) show the total data Tex and the total-sum data ΣTex in each recording pixel which are calculated form the preliminary decision data Dex of FIG. 10(b) when the initial value Din are set equal to zero, one, and two, respectively. The numbers of recording pixels to be exposed are respectively five, six, and eight in FIG. 10(c), FIG. 10(d), and FIG. 10(e).

The following are summary of the contents of FIGS. 9(a) through 9(e) and FIGS. 10(a) through 10(e).

(A) The number of recording pixels to be exposed according to the conventional method:
FIG. 9(a):9 pixels; FIG. 10(a):4 pixels (B) The number of recording pixels to be exposed according to the method of the embodiment:
FIG. 9(c):5 pixels; FIG. 10(c):5 pixels; where Din=0
FIG. 9(d) :6 pixels; FIG. 10(d) :6 pixels; where Din=1
FIG. 9(e) :7 pixels; FIG. 10(c): 8 pixels; where Din=2

In the conventional method, the number of recording pixels to be exposed is drastically affected by the relative position of the address range of screen pattern data (shown by the large circle in the figures) with respect to the recording pixels. Namely, the area of each halftone dot generated in the conventional method shows unfavorably large fluctuations. On the contrary, the method of the embodiment can reduce the fluctuations in area of the halftone dots as shown above. The above comparison also indicates that the number of recording pixels to be exposed depends on the initial value Din in the method of the embodiment. The large circle of FIG. 9(b) or FIG. 10(b) denotes the ideal halftone dot area. Since the ideal halftone dot area is practically equal to the area of seven recording pixels, the initial value Din is preferably set to be equal to one or two.

FIGS. 11(a) through 11(e) and FIGS. 12(a) through 12(e) schematically illustrate exposure determination process when the dot percent is no less than fifty. FIGS. 11(a) through 11(e) correspond to FIGS. 9(a) through 9(e), and FIGS. 12(a) through 12(e) to FIGS. 10(a) through 10(e). When the dot percent is not less than fifty, it is desirable to reduce the fluctuation in the number of pixels not to be exposed.

The following are summary of FIGS. 11(a) through 11(e) and FIGS. 12(a) through 12(e).

Figure 11A:
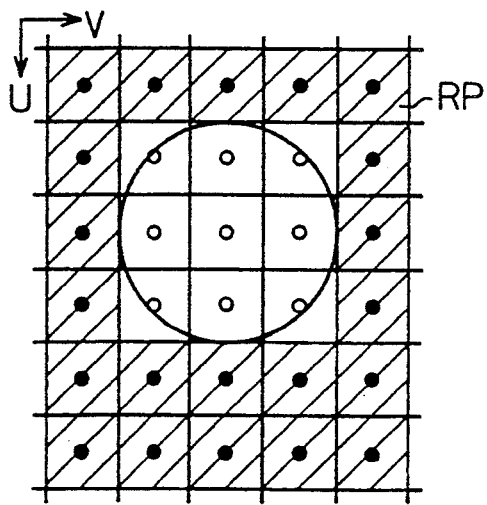
Figure 11B:
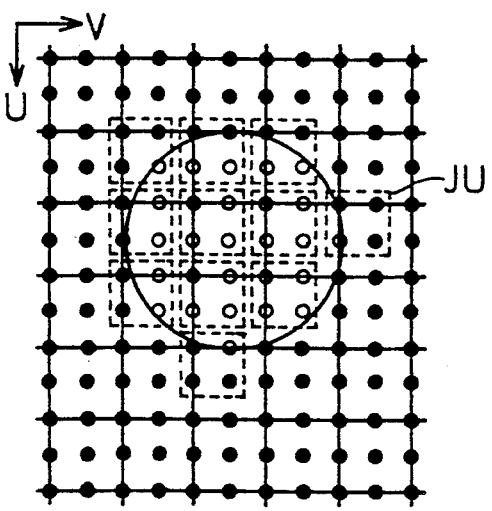
Figure 11C:
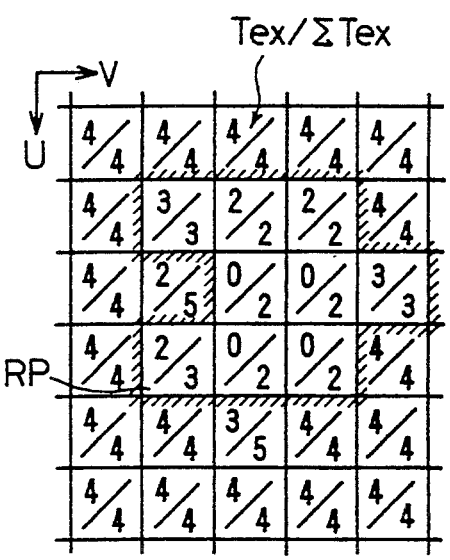
Figure 11C:
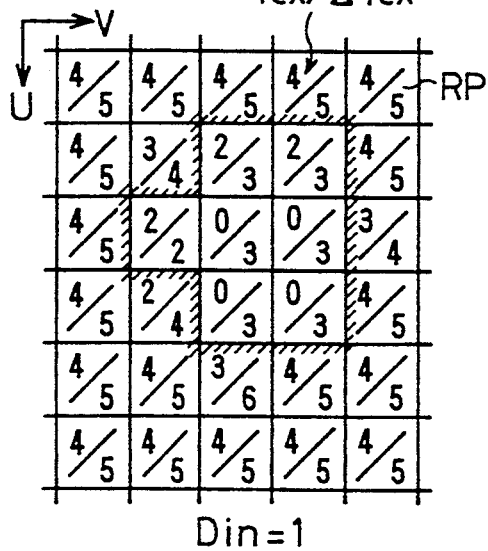
Figure 11C:
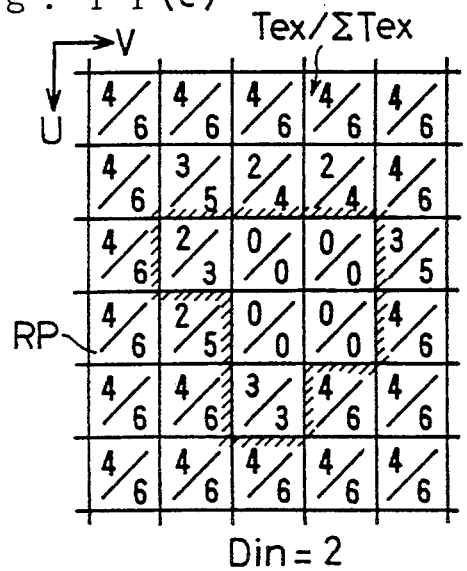
Figure 12A:
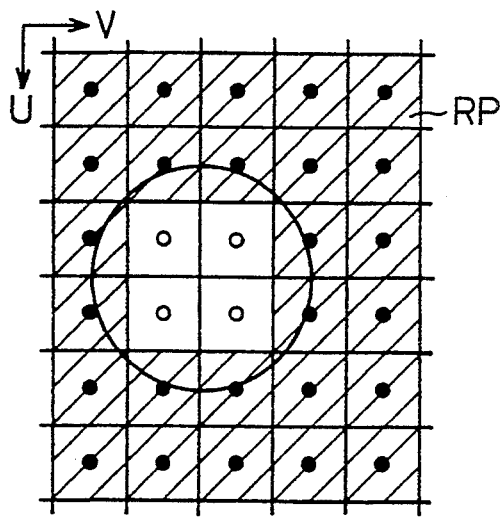
FIGS. 12(a) through 12(e) schematically illustrate determination process of exposure when the dot percent is no less than fifty percent.
Figure 12B:
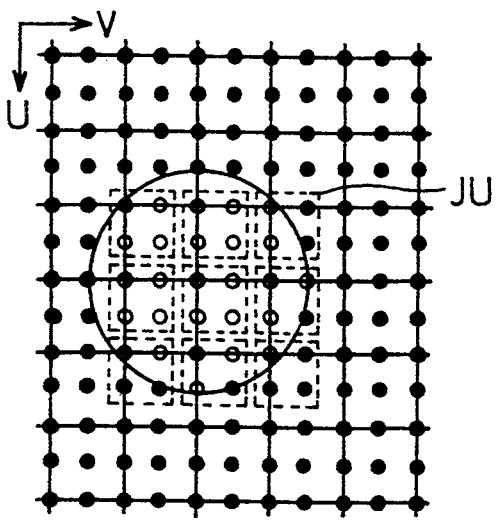
Figure 12C:
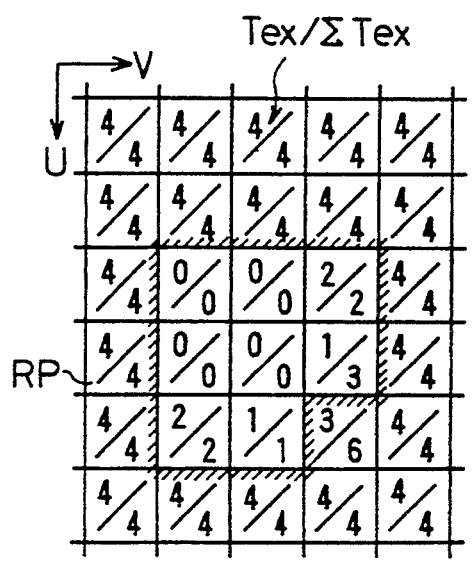
Figure 12D:
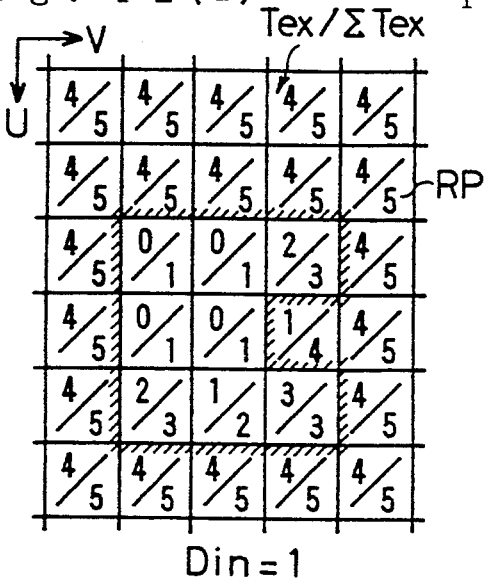
Figure 12E:
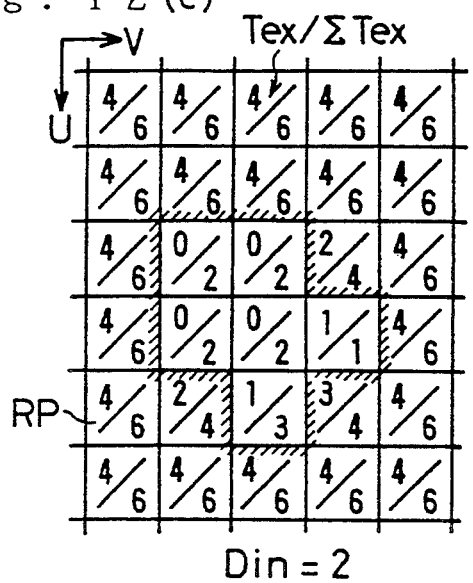

(A) The number of recording pixels determined not to be exposed according to the conventional method:
FIG. 11(a): 9 pixels; FIG. 12(a) : 4 pixels (B) The number of recording pixels determined not to be exposed according to the method of the embodiment:
FIG. 11(c): 9 pixels; FIG. 12(c): 8 pixels; where Din=0
FIG. 11(d): 7 pixels; FIG. 12(d) : 8 pixels; where Din=1
FIG. 11(e): 6 pixels; FIG. 12(c): 6 pixels; where Din=2

The method of the embodiment can also generate halftone dots which show small fluctuations in area for the halftone dot area rate of at least fifty percent. In this case, the preferable initial value Din is equal to one or two as is the case with FIGS. 9 and 10.

B. Structure and Operation of the First Embodiment

Figure 13:
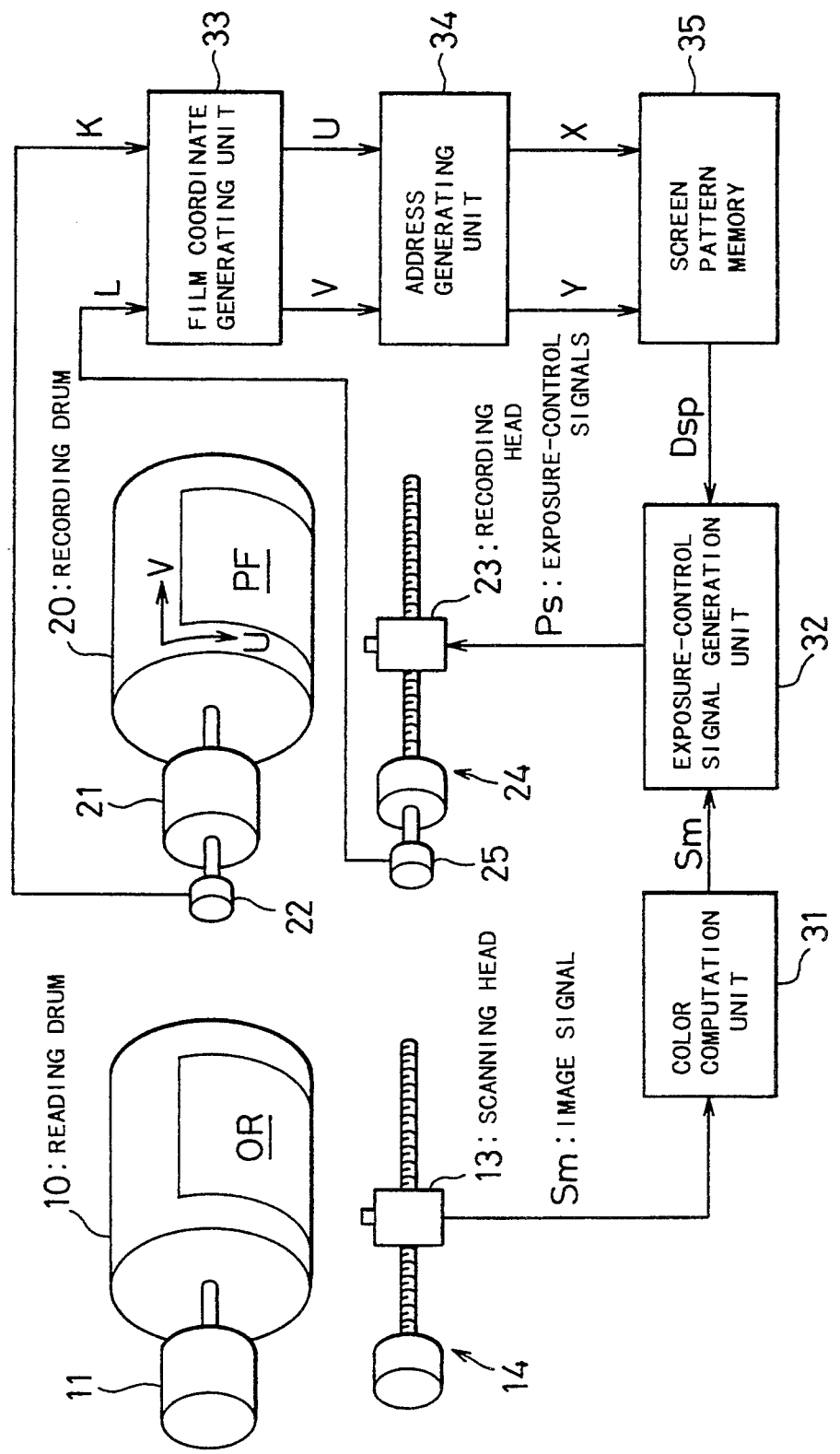
FIG. 13 is a schematic view showing the structure of an image recording apparatus for recording a halftone image according to the dot generation method of the first embodiment.

FIG. 13 is a schematic view illustrating the structure of an image recording apparatus for recording a halftone image according to the dot generation method of the first embodiment. The image recording apparatus comprises a reading drum 10, on which an original OR is held; and a recording drum, on which a photosensitive film PF is held.

The reading drum 10 is driven by a driving motor 11 to rotate around the central axis thereof at a predetermined rotational speed, and simultaneously a scanning head 13 is driven by a shuttle mechanism 14 with a ball thread to move along the central axis at a constant speed. The scanning head 13 scans the image of the original OR along the scanning lines and generates an image signal Sm. The image signal Sm is sent to a color computation unit 31 for executing color correction or tone correction and then supplied to an exposure-control signal generation unit 32.

The recording drum 20 is driven by a driving motor 21 to rotate around the central axis thereof at a predetermined rotational speed, and simultaneously a recording head 23 is driven by a shuttle mechanism 24 with a ball thread to move along the central axis at a constant speed. A rotary encoder 22 rotating with the recording drum 20 generates a position signal K in a primary scanning direction, whereas another rotary encoder 25 rotating with the rotation of a motor of the shuttle mechanism 24 generates another position signal L in a secondary scanning direction.

Figure 1:
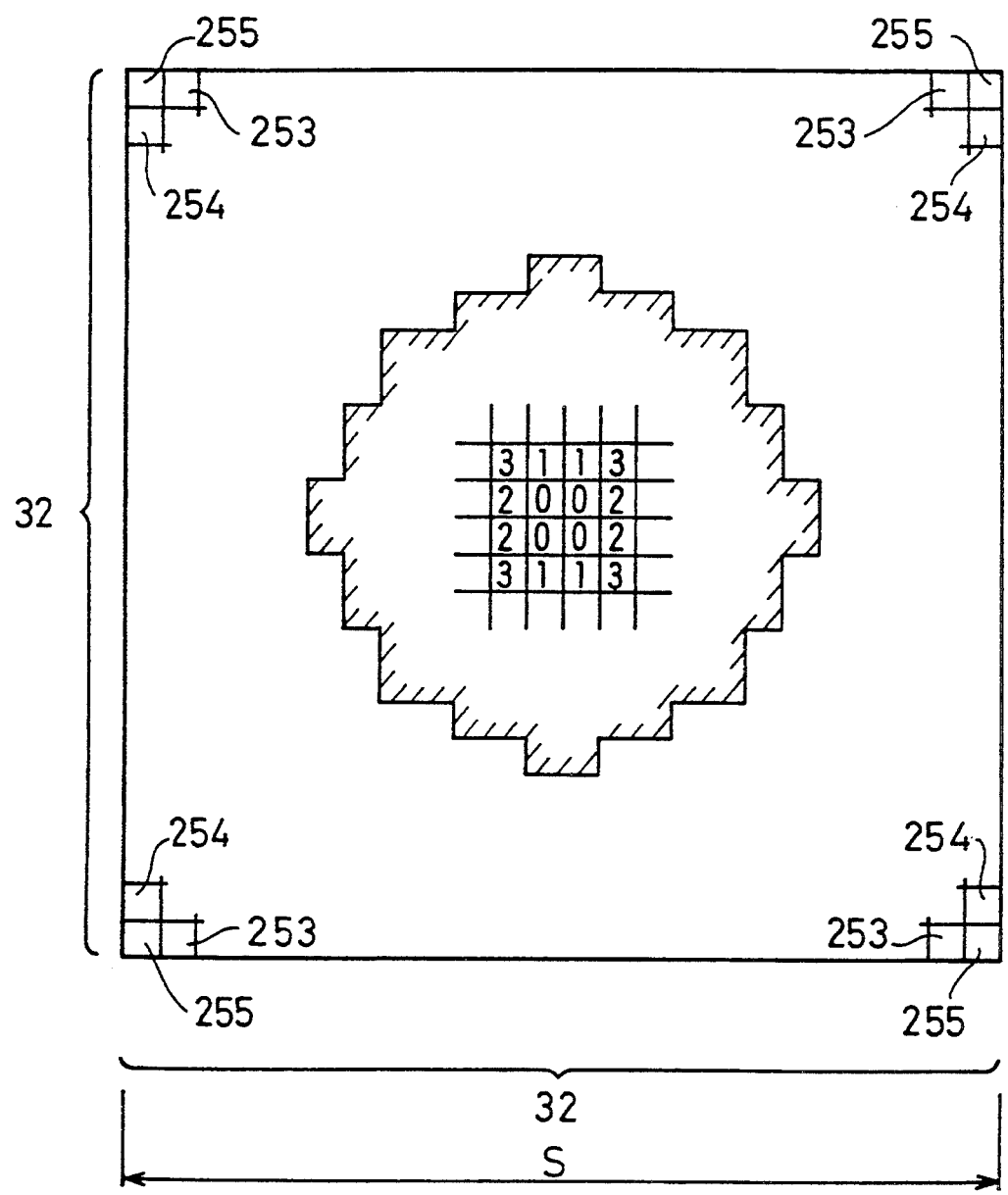
FIG. 1 shows an example of screen pattern data.
Figure 2A:
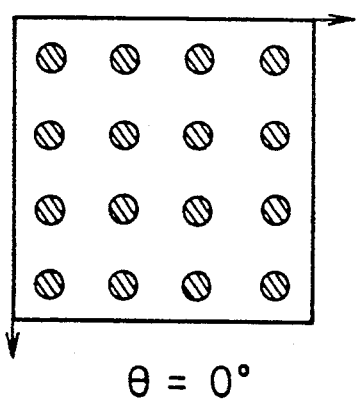
FIGS. 2(a) through 2(d) are conceptive views showing halftone dot arrangements for four screen angles.
Figure 2B:
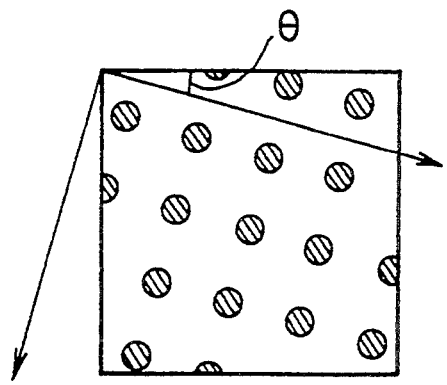
Figure 2C:
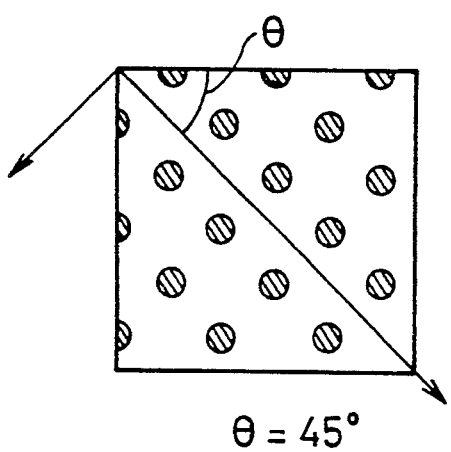
Figure 2D:
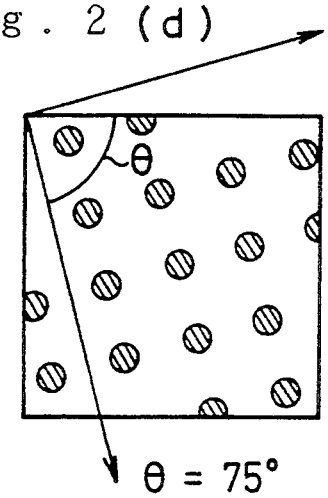
Figure 3:
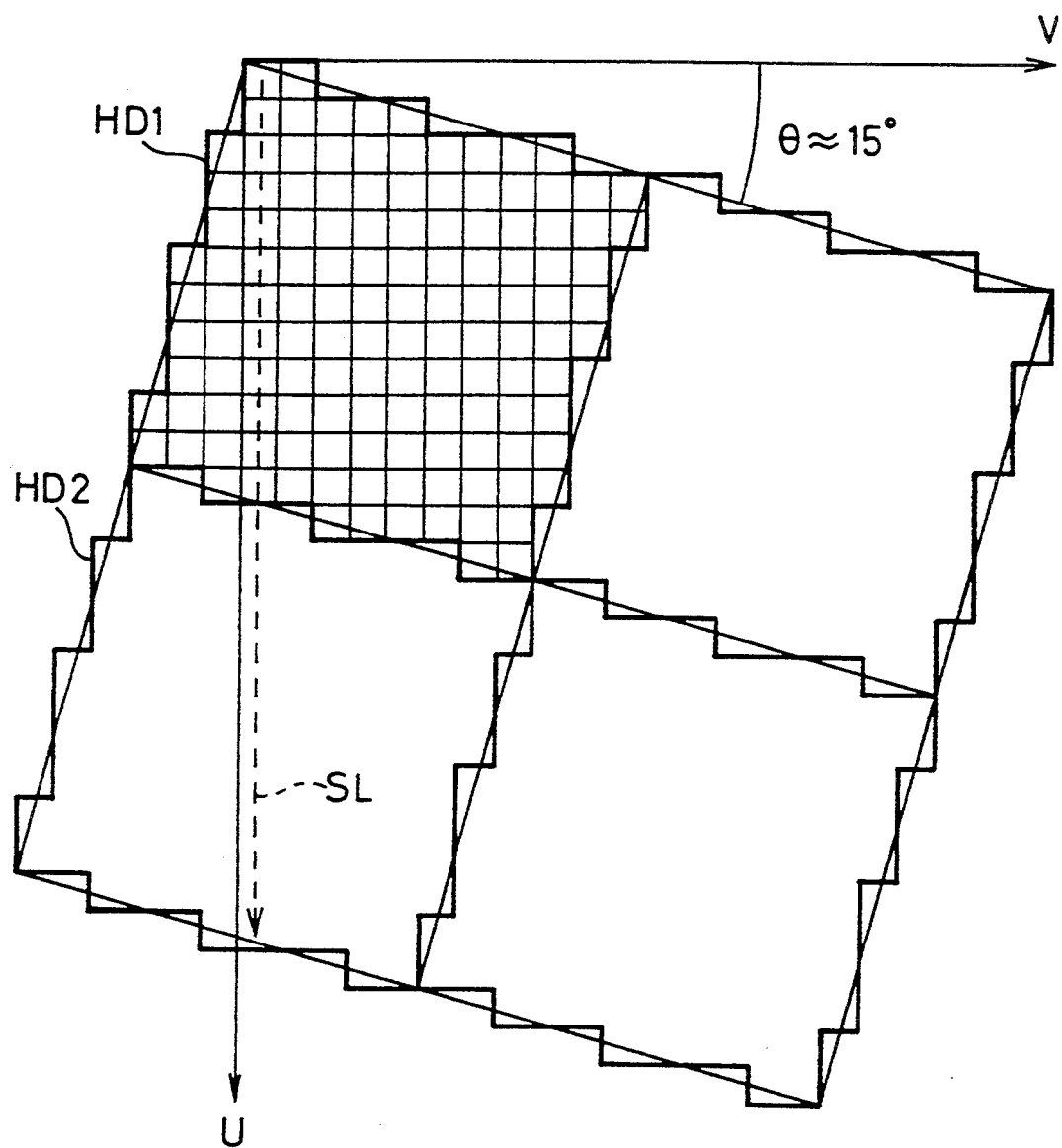
FIG. 3 is a conceptive view showing an arrangement of screen pattern data according to the rational tangent method.
Figure 4:
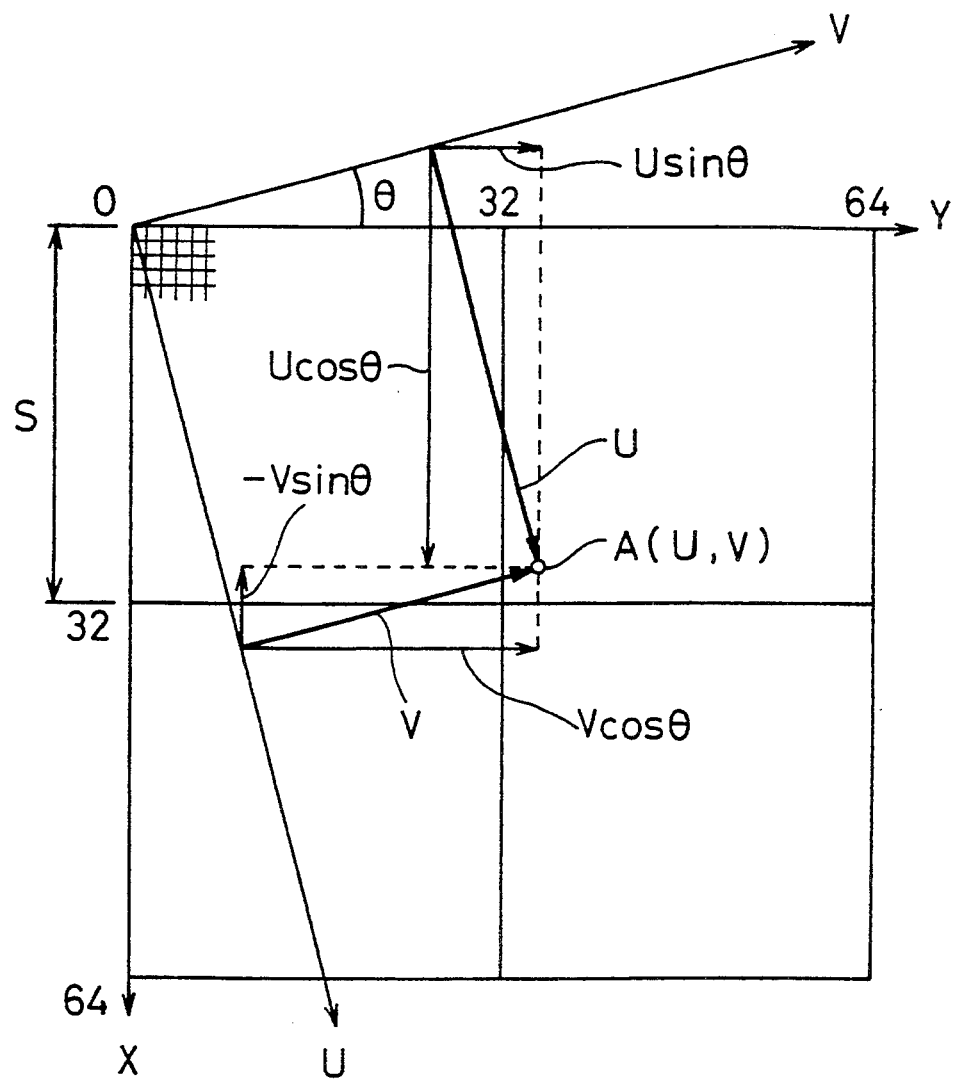
FIG. 4 is a conceptive view showing application of screen pattern data in the irrational tangent method.
Figure 5:
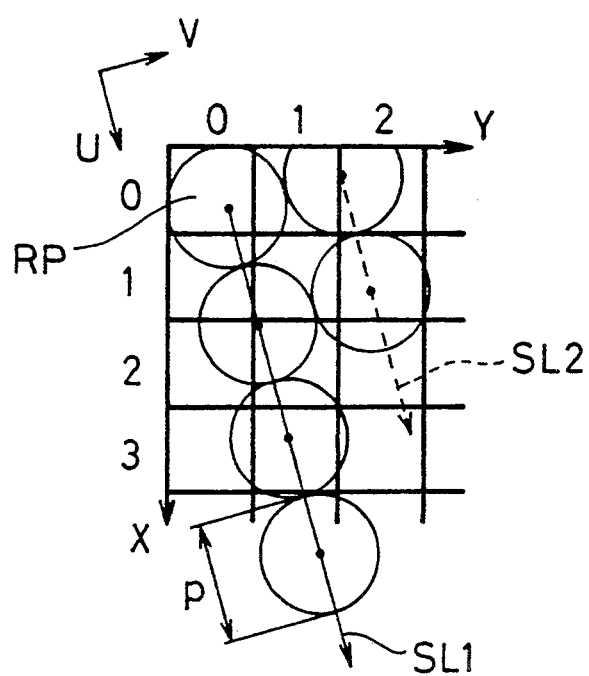
FIG. 5 illustrates the relationship between the arrangement of recording pixels and the address on a screen pattern memory in the irrational tangent method.

A film coordinate generating unit 33 converts the position signals K, L to coordinates (U, V) in the scanning coordinate system on the photosensitive film PF. The unit of the scanning coordinate system is equal to the side length p of a recording pixel. The scanning coordinate system (U, V) are identical to the the U-V coordinate system shown in FIG. 4. The scanning coordinates (U, V) are then converted by an address generating unit 34 into an address (X, Y) of a screen pattern memory unit 35. The address (X, Y) is sent from the address generating unit 34 to the screen pattern memory unit 35. Consequently, screen pattern data Dsp stored at the address (X, Y) is read from the screen pattern memory unit 35 and supplied to the exposure-control signal generation unit 32. The screen pattern data Dsp, as shown in FIG. 1 for example, includes threshold values arranged in a matrix corresponding to one halftone dot region with the screen angle $\theta$ of zero degree.

The exposure-control signal generation unit 32 compares the image signal Sm with the screen pattern data Dsp, and generates an exposure-control signal Ps indicating whether each recording pixel is to be exposed or not. The electrical structure of the exposure-control signal generation unit 32 will be described later. The recording head 23 on-off controls a laser beam in response to the exposure-control signal Ps to record a halftone image on the photosensitive film PF.

The pair of the equations (1a) and (1b) or (2a) and (2b) are used for conversion of the scanning coordinates (U, V) to the address (X, Y). Details of such conversion are described in U.S. Pat. Nos. 4,673,971, 4,543,613, and 4,499,489, the disclosures of which are incorporated herein by reference. According to the conversion method explained in the above references, one halftone dot region is divided into the Nth power of 2, and the exact address is expressed in (M+N) bits, where N denotes an integral number part and M denotes a decimal fraction part. The upper N bits of the address (X,Y) determined according to the equations (1a) and (1b) are supplied to the screen pattern memory unit 35 for reading out the corresponding screen pattern data. For example, in the screen pattern data shown in FIG. 1, a halftone dot region is divided into $2^5$ times $2^5$ (=32×32). The address generating unit 34 determines the address (X,Y) in the predetermined number of bits not less than five bits (for example, 32 bits). The value expressed by the upper five bits of the 32 bit address is supplied from the address generating unit 34 to the screen pattern memory unit 35.

Figure 14:
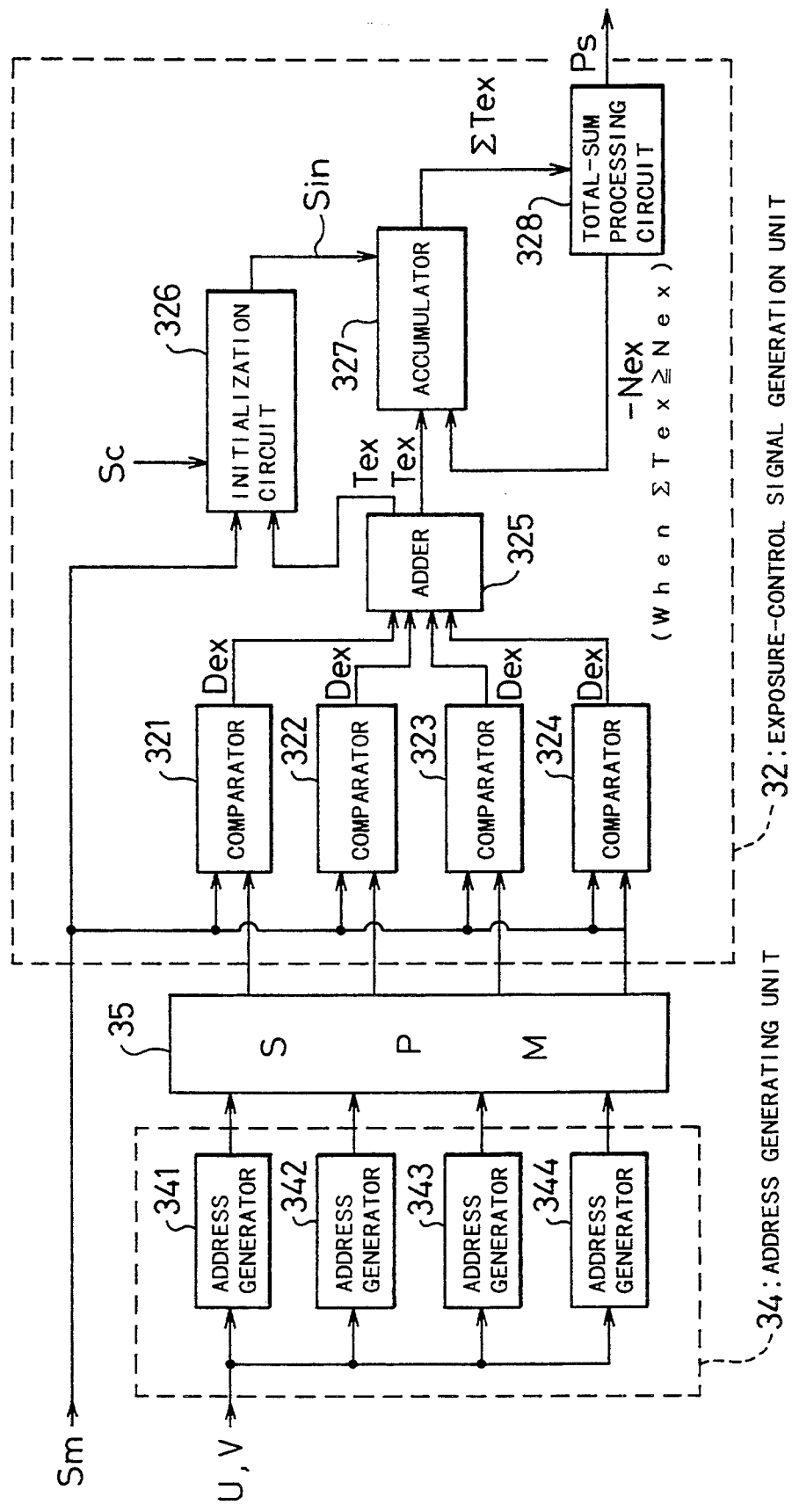
FIG. 14 is a block diagram illustrating the electrical structure of an address generating unit, a screen pattern memory unit, and an exposure- control signal generation unit of FIG. 13.

FIG. 14 is a block diagram illustrating the electrical structure of the address generating unit 34, the screen pattern memory unit 35, and the exposure-control signal generation unit 32.

The address generating unit 34 includes four address generators 341 through 344, which generate four addresses to read out four screen pattern data Dsp at the four exposure-decision points RC, SP1, SP2, and SP3 of each exposure-decision unit JU (FIG. 7). Suppose that the address of the exposure center RC in a recording pixel is equal to (X, Y), the addresses (X1, Y1), (X2, Y2), and (X3, Y3) of the three sub-decision points SP1 through SP3 are expressed as:

$$X1 = X - 0.5(p^*\cos\theta - p^*\sin\theta) \tag{5a}$$

$$Y1 = Y - 0.5(p^*\sin\theta + p^*\cos\theta) \tag{5b}$$

$$X2 = X - 0.5(p^*\cos\theta) \tag{6a}$$

$$Y2 = Y - 0.5(p^*\sin\theta) \tag{6b}$$

$$X3 = X - 0.5(-p^*\sin\theta) \tag{7a}$$

$$Y3 = Y - 0.5(+p^*\cos\theta) \tag{7b}$$

The screen pattern data are read from the screen pattern memory unit 35 in response to the respective upper five bits of the four sets of addresses (X, Y), (X1, Y1), (X2, Y2), and (X3, Y3). The screen pattern memory unit 35 includes four memories storing identical screen pattern data. Screen pattern data at the four exposure-decision points are simultaneously read from the four memories of the memory unit 35 and supplied to the exposure-control signal generation unit 32.

The exposure-control signal generation unit 32 includes four comparators 321 through 324, an adder 325, an initialization circuit 326, an accumulator 327, and a total-sum processing circuit 328. The four comparators 321 through 324 receive the four screen pattern data supplied from the screen pattern memory unit 35, and an image signal Sm output from the color computation unit 31. The comparators 321 through 324 then output preliminary decision data Dex at the four exposure-decision points according to the above conditions (3a) and (3b). The adder 325 sums up the four preliminary decision data Dex to produce the total data Tex, which is supplied to the initialization circuit 326 and the accumulator 327. The accumulator 327 adds the total data Tex of the current pixel with the carry-over data Dco of the preceding pixel to generate the total-sum data $\Sigma$Tex.

The total-sum processing circuit 328 compares the total-sum data $\Sigma$Tex from the accumulator 327 with the predetermined number Nex of exposure- decision points. When $\Sigma$Tex is equal to or greater than Nex, the processing circuit 328 raises an exposure- control signal Ps and supplies data of (−Nex) to the total-sum data $\Sigma$Tex in the accumulator 327. The accumulator 327 adds (−Nex) to the total-sum data $\Sigma$Tex, accordingly. When $\Sigma$Tex is less than Nex, on the contrary, the processing circuit 328 lowers the exposure-control signal Ps but does not supply data of (−Nex) to the accumulator 327. After completion of these processes, the total-sum data $\Sigma$Tex in the accumulator 327 becomes the carry-over data Dco for the next recording pixel. The accumulator 327 holds the carry-over data Dco until receiving the new total data Tex of the next recording pixel which is supplied from the adder 325 in synchronism with a clock signal (not shown).

The initialization circuit 326 initializes the accumulator 327 according to the initialization conditions (d1) and (d2) described before. When the level of the image signal Sm is less than fifty percent in halftone dot area rate, and when Tex is equal to zero, an initialization signal Sin is sent from the initialization circuit 326 to the accumulator 327, and the accumulator 327 outputs the initial value Din instead of the total-sum data ΣTex. Also when the level of the image signal Sm is equal to or greater than fifty percent in halftone dot area rate, and then Tex is equal to Nex, the accumulator 327 outputs the initial value Din. The initialization circuit 326 also outputs the initialization signal Sin in response to a start clock Sc which is given at the beginning of each primary scanning line.

The exposure-control signal generation unit 32, cooperating with the address generating unit 34, generates an exposure-control signal Ps for controlling exposure of each recording pixel according to the method described above. Since the halftone dots in this embodiment have areas proportional to the level of the image signal as shown in FIGS. 9 through 12 irrespective of the relative position of the address range of screen pattern data against the recording pixels, the halftone image shows small fluctuations in tone.

C. Modification of the First Embodiment

Figure 15:
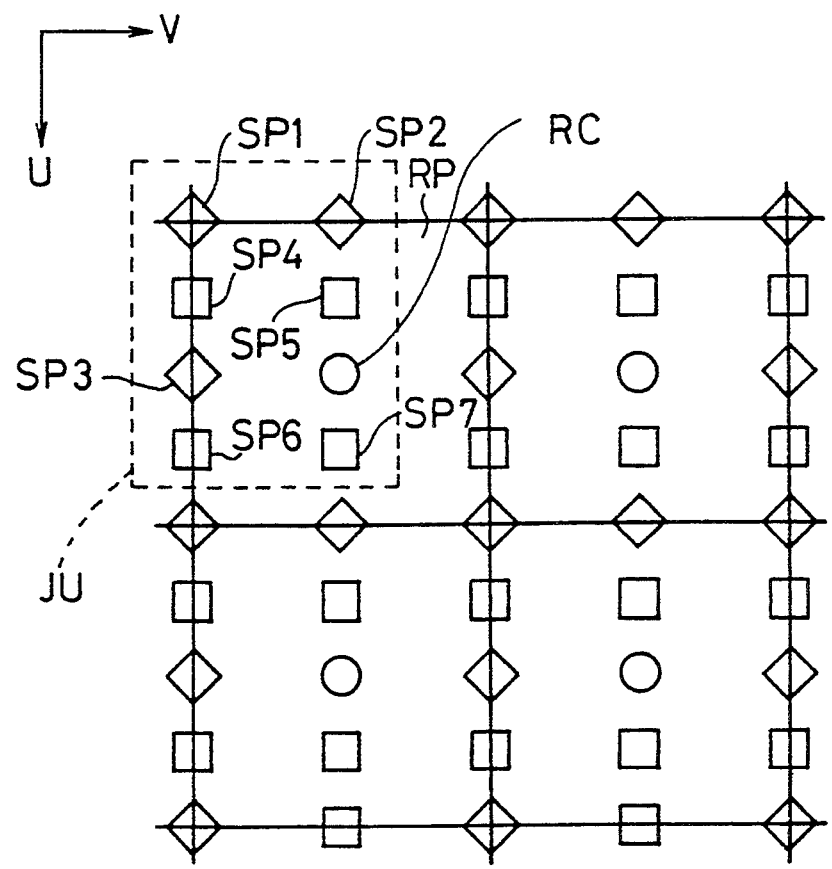
FIG. 15 shows another arrangement of exposure-decision points.

The first embodiment can be modified as follows:

(1) The four exposure-decision points shown in FIG. 7 may be replaced by eight exposure-decision points (Nex =8), as shown in FIG. 15, including an exposure center RC and seven sub- decision points SP1 through SP7. The number of exposure-decision points in the primary scanning direction U in FIG. 15 is twice as many as that of FIG. 7.

FIGS. 16(a) through 16(e) and FIGS. 17(a) through 17(e) schematically illustrate exposure determination process using the eight exposure-decision points shown in FIG. 15. FIGS. 16(a) through 16(e) correspond to FIGS. 9(a) through 9(e), and FIGS. 17(a) through 17(e) to FIGS. 10(a) through 10(e), respectively. The results of FIGS. 16(a) through 16(e) and FIGS. 17(a) through 17(e) are similar to those of FIGS. 9(a) through 9(e) and FIGS. 10(a) through 10(e), respectively. When an exposure-decision unit JU includes the eight exposure-decision points as shown in FIG. 15, eight address generators and eight comparators are required in the circuitry of FIG. 14. Use of the four exposure-decision points is preferable from the viewpoint of cost performance.

The exposure decision points can be defined to be other points which have predetermined positional relations with the center of each recording pixel, other than those shown in FIG. 7 or FIG. 15. When the center of a recording pixel and lattice points of a lattice which is formed along the primary scanning direction and the secondary scanning direction are selected as the exposure-decision points, the addresses of all the exposure-decision points are easily determined according to equations similar to the equations (5a) through (7b) stated before.

(2) The following conditions (e1) and (2) are applicable, in place of the above conditions (d1) and (d2), to set the carry-over data Dco at the initial value Din:

(e1) The level of the image signal is less than fifty percent in halftone dot area rate, and at least one of the values X and Y of the address of the screen pattern data representing the exposure center RC exceeds one end of the screen pattern memory area (or a halftone dot region in FIG. 1);

(e2) The level of the image signal is equal to or greater than fifty percent in halftone dot area rate, and at least one of the values X and Y of the address of the screen pattern data representing the exposure center RC exceeds the center of the screen pattern memory area (or a halftone dot region in FIG. 1).

When the condition (e1) or (e2) holds, the carry-over data Dco is initialized in the same manner as the above condition (d1) or (d2). When the dot percent is less than fifty as shown in FIG. 8(a), the end of each halftone dot region, which is drawn with one-dot chain lines, separates two adjacent halftone dot regions. In the condition (e1), the carry-over data Dco is set to be the initial value Din, to thereby prevent the value of the carry-over data Dco for one halftone dot, or one exposed area, from affecting exposure determination for the next halftone dot. On the other hand, when the dot percent is not less than fifty as shown in FIG. 8(b), the center of each dot region, which is drawn with two-dot chain lines, separates two adjacent non-exposed areas. In the condition (e2), the carry-over data Dco is set to be the initial value Din, to thereby prevent the value of the carry-over data Dco for one non-exposed area from affecting exposure determination for the next non-exposed area.

The conditions (e1) and (e2) may be judged on the basis of the address of another exposure-decision point in place of that of the exposure center RC.

Figure 18:
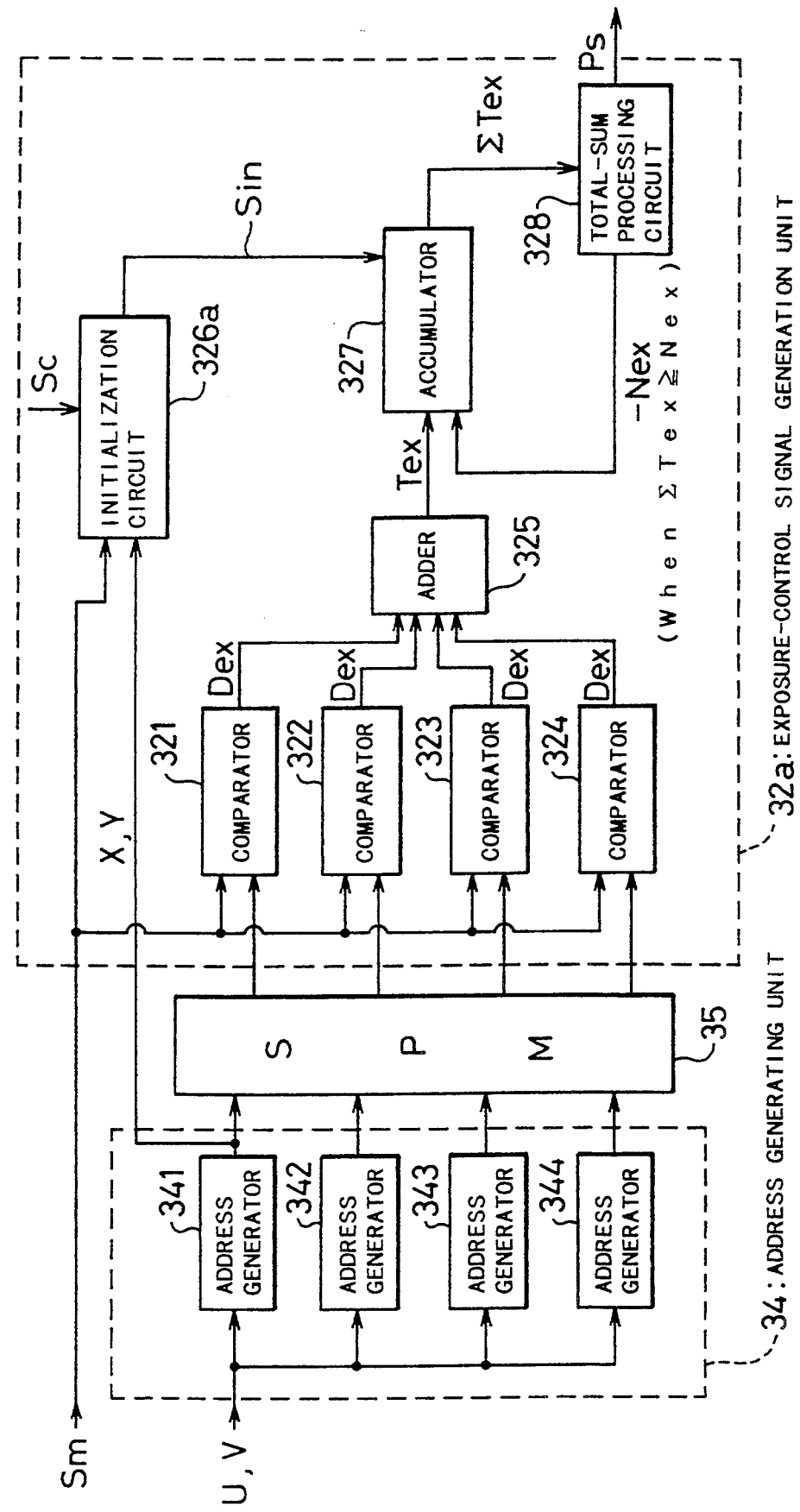
FIG. 18 is a block diagram illustrating the electrical structure of the address generating unit and another exposure-control signal generation unit used for initialization of carry-over data based on other conditions.

FIG. 18 is a block diagram illustrating the structure of the address generating unit 34 and an exposure-control signal generation unit 32a, which are used for initialization of the carry-over data Dco on the conditions (e1) and (e2). The structure and operation shown in FIG. 18 are the same as those of the first embodiment (FIG. 14) except an initialization unit 326a. The initialization unit 326a receives the address (X, Y) of the exposure center RC supplied from the address generator 341, and generates an initialization signal Sin to the accumulator 327 on the condition (e1) or (e2). The output of the accumulator 327, that is, the total-sum data ΣTex or the carry-over data Dco, is initialized to the initial value Din in response to the initialization signal Sin.

(3) Exposure or non-exposure of each recording pixel may be determined without subtracting Nex from the total sum data ΣTex. In such a case, for example, the number of recording pixels which have already been exposed on the current scanning line is stored with the total sum data ΣTex. The product of the number of exposed pixels and the number Nex is subtracted from the total-sum data ΣTex for each recording pixel, and the result of subtraction is compared with Nex to determine exposure or non-exposure of the recording pixel.

(4) The initial value Din can be set at any value between zero and (Nex-1), but the value in the range of (Nex/2+1) to (Nex/2−1) is especially preferable to make the halftone dot area proportional to the level of the image signal. For example, when the four exposure-decision points are used for exposure determination, it is preferable to set the initial value Din to be one, two, or three.

(5) Results of exposure determination may be stored in any desirable form. For example, halftone image data showing exposure or non-exposure of each recording pixel is produced and stored in a memory unit such as a magnetic disk.

D. Second Embodiment

The first embodiment is further improved into a second embodiment, in which the halftone dot area shows less fluctuations and the dot shape is more favorable for printing. The improvements over the first embodiment are described first.

Figure 19A:
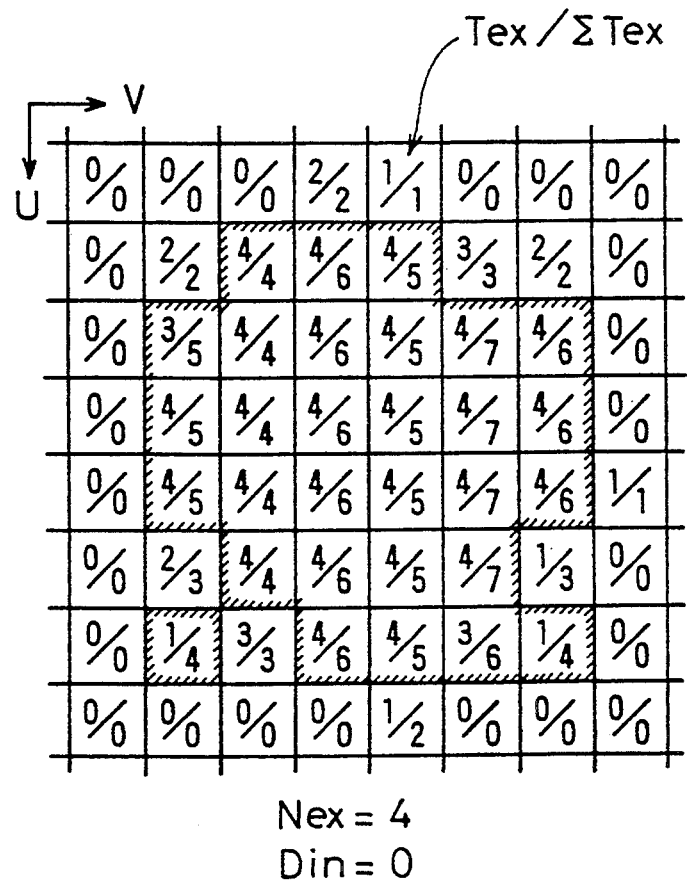
FIGS. 19(a) through 19(c) illustrate exchange of the results of exposure determination in a second embodiment when the dot percent is less than fifty percent.
Figure 19B:
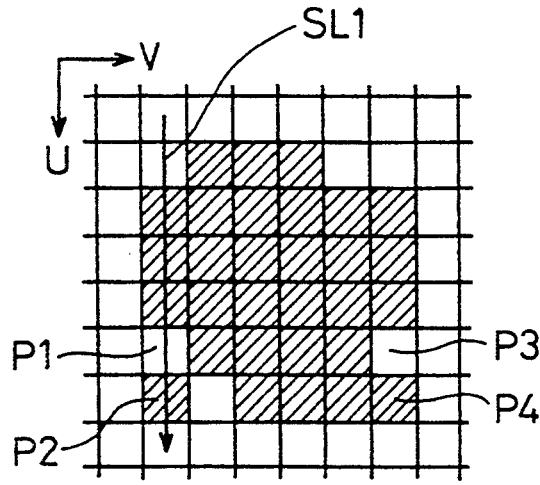

FIG. 19(a) shows the total data Tex and the total-sum data $\Sigma$Tex in each recording pixel when exposure or non-exposure is determined according to the method of the first embodiment. Here, the number Nex of exposure-decision points is equal to four, and the initial value Din is equal to zero. According to the first embodiment, the recording pixels whose total-sum data $\Sigma$Tex is equal to or greater than Nex are determined to be exposed; FIG. 19(b) shows the results of this exposure or non-exposure decision. In FIG. 19(b), a recording pixel P2 at lower left is isolated from a collection of recording pixels to be exposed, or a halftone dot. A recording pixel P1 immediately before the recording pixel P2 in the primary scanning direction U is a non-exposed point and intercepts the continuation of exposed pixels. The same phenomenon is observed for another recording pixel P4 at lower right. A recording pixel P3 immediately before the recording pixel P4 in the primary scanning direction U is a non-exposed point, and intercepts the continuation of exposed pixels. Such recording pixels as P2 and P4 are hereinafter referred to as "isolated exposure points".

The isolated exposure points P2 and P4 are not accurately recorded on the photosensitive film PF. Even if accurate recording on the photosensitive film PF is incidentally attained, the isolated exposure points generally cause so-called "dot gain". The dot gain is an phenomenon in which an excessive amount of printing ink is applied to the isolated exposure points on a printing sheet. Consequently, the instability of the isolated exposure points lowers the reproducibility of the halftone dot area.

This dot gain is observed on isolated exposure points when the dot percent is less than fifty. A similar phenomenon occurs to isolated non-exposure points when the dot percent is no less than fifty. In this case, the instability of the isolated non-exposure points lowers the reproducibility.

The isolated exposure points and the isolated non-exposure points (hereinafter referred to as "isolated points") can be prevented by setting the initial value Din equal to one or two in some cases. In general, the value between one and Nex/2 is preferable as the initial value Din for elimination of the isolated points. The experiment by the inventors proved that many isolated points were eliminated by setting the initial value Din equal to one where the number Nex of exposure-decision points is equal to four. Especially, the isolated points at the front end of the halftone dot in the primary scanning direction U, that is, those at the upper end of the halftone dot in FIG. 19(b), were efficiently eliminated by setting the initial value Din at some appropriate value.

In some cases, however, the isolated points at the rear end of the halftone dot in the primary scanning direction U, that is, those at the lower end of the halftone dot in FIG. 19(b), were not eliminated with any initial value Din. FIG. 20(a) shows an example of the total data Tex and the total-sum data $\Sigma$Tex in each recording pixel where the dot percent is not less than fifty percent, where the number Nex of exposure-decision points is equal to four, and where the initial value Din is set equal to one. FIG. 20(b) shows exposed pixels as shaded squares which are exposed according to the first embodiment. In FIG. 20(b), a recording pixel P6 at lower left is an isolated point. This isolated point P6 is not eliminated by changing the initial value Din.

The inventors improved the method of the first embodiment to eliminate the isolated points.

Figure 19C:
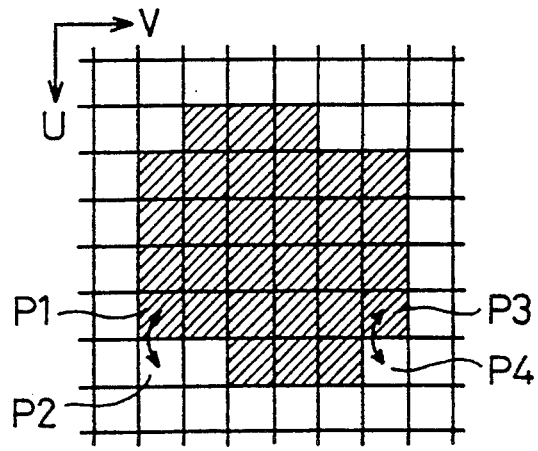

In this improved method of the second embodiment, the results of exposure or non-exposure determination for the isolated points or pixels P2, P4, and P6 in FIG. 19(b) and FIG. 20(b) are exchanged with the results for the preceding pixels P1, P3, and P5 in the primary scanning direction U, to thereby eliminate the isolated points. FIG. 19(c) and FIG. 20(c) illustrate elimination of the isolated points. In FIG. 19(c), the result for the pixel P2 is exchanged with that of the pixel P1, and the result for the pixel P4 by that of the pixel P3. In FIG. 20(c), the result of the pixel P6 is exchanged with that of the pixel P5.

The inventors of the present invent ion found out the following conditions (f1) and (f2) in which the results of exposure or non-exposure determination are to be exchanged between two adjacent pixels:

(f1) The level of the image signal is less than fifty in halftone dot area rate, and the total data Tex of the target pixel is equal to an integer between one and a predetermined first reference value $D \times 1$, and the target pixel is determined to be exposed;

(f2) The level of the image signal is no less than fifty in halftone dot area rate, and the total data Tex of the target pixel is equal to an integer between a predetermined second reference value $D \times 2$ and (Nex-1), and the target pixel is determined not to be exposed.

The first reference value $D \times 1$ is preferably set in a range between one and Nex/2, while the second reference value $D \times 2$ between Nex/2 and (Nex−1). For example, when Nex is equal to four, preferable values for $D \times 1$ and $D \times 2$ are one and three, respectively. The pixels P2 and P4 in FIG. 19(b) or FIG. 19(c) satisfy the above condition (f1), whereas the pixel P6 in FIG. 20(b) or FIG. 20(c) satisfies the condition (f2).

When the condition (f1) holds, the adjacent recording pixel preceding the target pixel may also be determined to be exposed. In a similar manner, when the condition (f2) holds, the adjacent recording pixel preceding the target pixel may also be determined not to be exposed. In such cases, exchange of the determination results may or may not be executed since the results are the same. However, the electrical structure can be simplified if the results of exposure or non-exposure determination are exchanged between the adjacent pixels without any exceptions on the condition (f1) or (f2).

Figure 21:
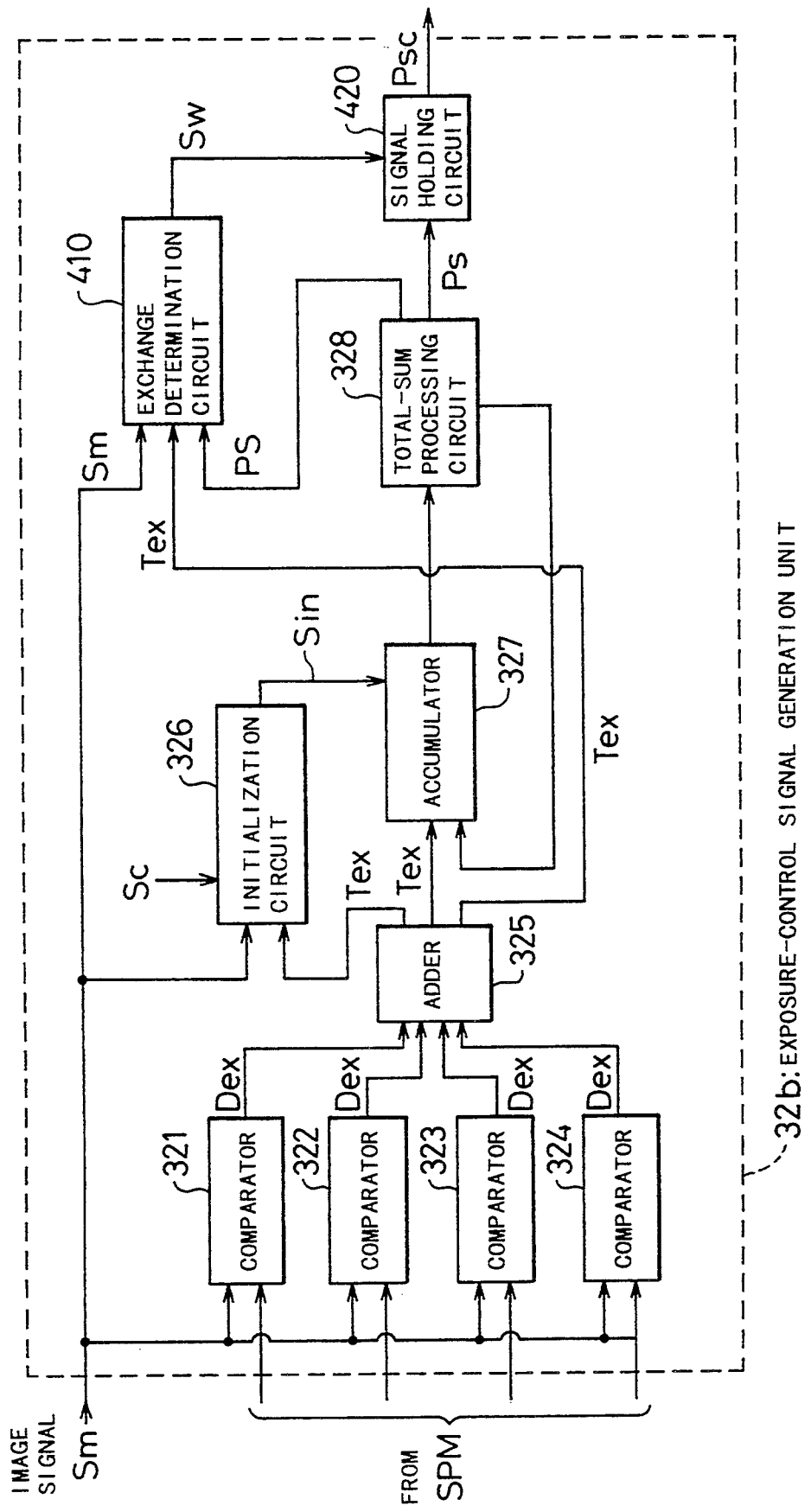
FIG. 21 is a block diagram showing the structure of an exposure-control signal generation unit for correcting an exposure-control signal.

FIG. 21 is a block diagram showing an exposure-control signal generation unit 32b used for elimination of the isolated points according to the second embodiment. The exposure-control signal generation unit 32b has the same structure as the exposure-control signal generation unit 32 of FIG. 14 except an exchange determination circuit 410 and a signal holding circuit 420. The exchange determination circuit 410 receives the image signal Sm, the total data Tex supplied from the adder 325, and the exposure-control signal Ps supplied from the total-sum processing circuit 328. The exchange determination circuit 410 raises the level of of an exchange signal Sw when one of the conditions (f1) and (f2) holds, and supplies the exchange signal Sw to the signal holding circuit 420.

Figure 22A:
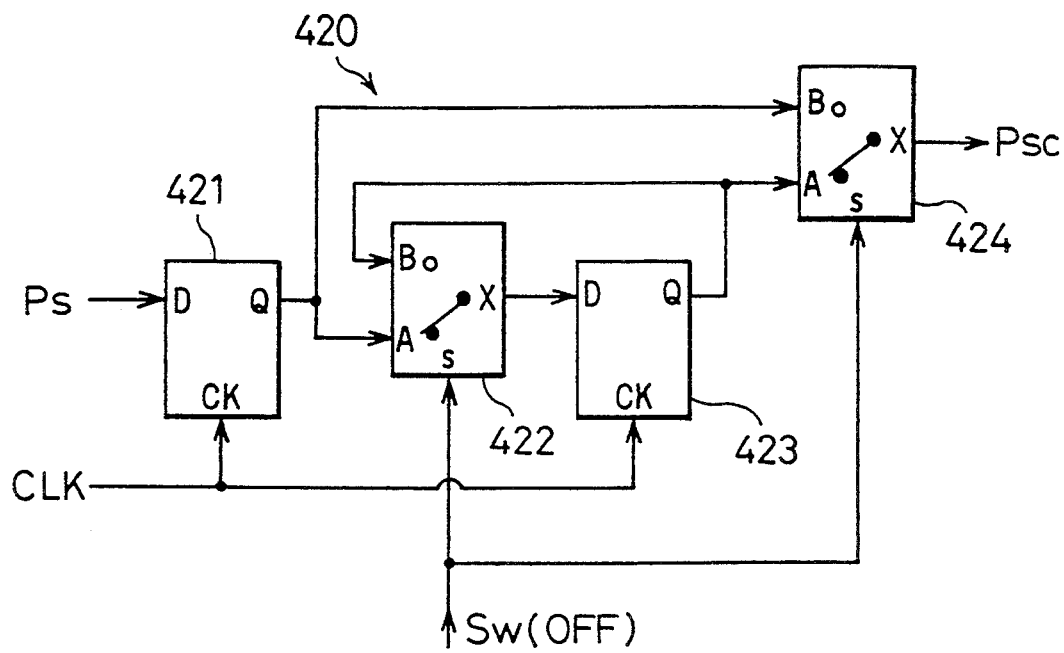
FIGS. 22(a)-(b) are a block diagram illustrating the electrical structure of the signal holding element of FIG. 21.
Figure 22B:
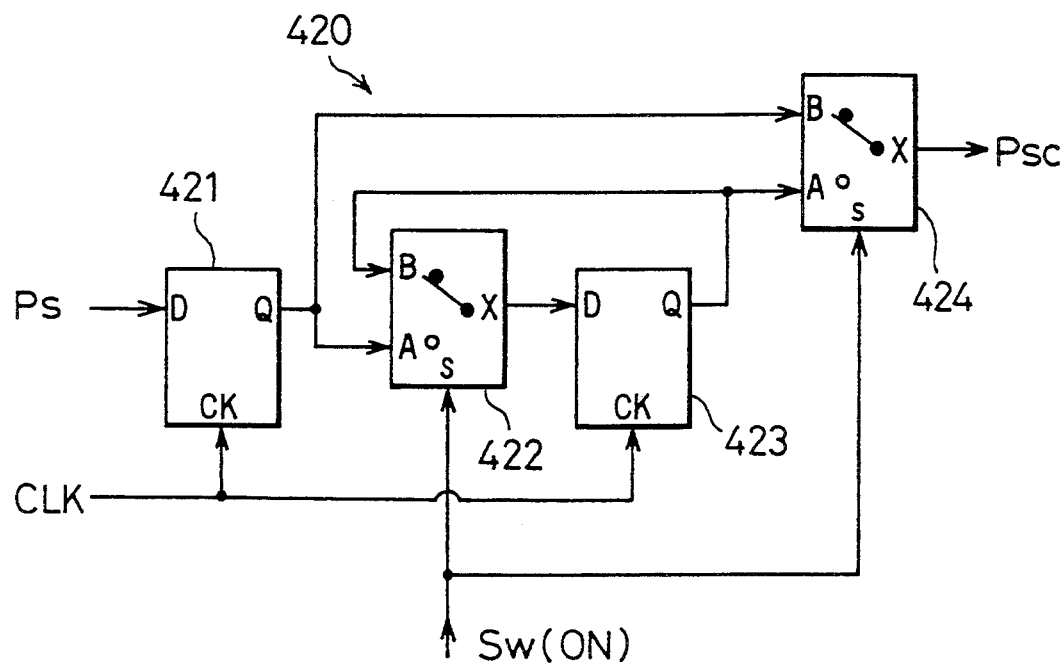

FIG. 22(a) is a block diagram showing the electrical structure of the signal holding circuit 420 when the exchange signal Sw is at the low level; FIG. 22(b) is a block diagram showing the same structure when the exchange signal Sw is at the high level.

The signal holding element 420 includes two D-type flip-flops 421, 423, and two data selectors 422, 424. Each clock input terminal of the D-type flip-flops 421, 423 receives a clock signal CLK, which is also supplied to the other internal elements of the exposure-control signal generation unit 32b for synchronization of all the internal elements.

The D input terminal of the first D-type flip-flop 421 receives the exposure-control signal Ps supplied from the total-sum processing circuit 328. The Q output of the first D-type flip-flop 421 is supplied to the A input terminal of the first data selector 422 and the B input terminal of the second data selector 424. The output of the first data selector 422 is further supplied to the D input terminal of the second D-type flip-flop 423. The Q output of the second D-type flip-flop 423 is supplied to the B input terminal of the first data selector 422 and the A input terminal of the second data selector 424. The second data selector 424 of the exposure-control signal generation unit 32b supplies the Q output as a corrected exposure-control signal Psc to the recording head 23 (FIG. 13).

As shown in FIG. 22(a), when the exchange determination circuit 410 lowers the exchange signal Sw, both of the data selectors 422, 424 output the data supplied at the respective A input terminals. The L-level exchange signal Sw indicates no exchange of results of the exposure decision between the two adjacent pixels. The second data selector 424 outputs the Q output of the second D-type flip-flop 423 as the corrected exposure-control signal Psc, consequently.

As shown in FIG. 22 (b), when the exchange determination element 410 raises the exchange signal Sw, both of the data selectors 422, 424 output the data supplied at the respective B input terminals. The H-level exchange signal Sw indicates exchange of results of the exposure decision between the two adjacent pixels. The second data selector 424 outputs the Q output of the first D-type flip flop 421 as the corrected exposure-control signal Psc, consequently.

FIG. 23 is a timing chart showing the operation of the signal holding circuit 420. Signals Q421 and Q423 denote the Q output of the D-type flip flops 421 and 423, respectively, and X422 and X424 denote the output from the data selectors 422 and 424, respectively. The operation shown in FIG. 23 corresponds to the processing along a scanning line SL1 of FIG. 19(b).

The timing chart of FIG. 23 shows that the level change of the exposure-control signal Ps affects Q421 after delay of one clock pulse. In other words, the first D-type flip flop 421 holds the exposure-control signal Ps at the rising edge of the clock signal CLK.

When the exchange signal Sw is "OFF", or at the L-level, the second D-type flip-flop 423 holds the Q output of the first D-type flip-flop 421 at the next rising edge of the clock signal CLK. The signal holding circuit 420 then outputs the Q output of the second D-type flip-flop 423 as the corrected exposure-control signal Psc. Three exposure points on the scanning line SL1 (FIG. 19(b)) are accordingly exposed during a time period between t3 and t6.

When the exchange signal Sw becomes "ON", or H level, at the time point t6, the data selector 424 picks up the Q output of the first D-type flip-flop 421 to output it as the corrected exposure-control signal Psc. Since the Q output of the first flip-flop 421 is at the H level during a time period between t6 and t7, the corrected exposure-control signal Psc is also at the H level. The time period between t6 and t7 corresponds to the recording pixel P1 in FIG. 19(b), and the recording pixel P1 is exposed as shown in FIG. 19(c) accordingly. During the time period between t6 and t7, the first data selector 422 picks up the Q output of the second D-type flip-flop 423.

When the exchange signal Sw becomes "OFF", or L level, at the time point t7, the second flip-flop 423 holds the output of the first data selector 422 at the time t7, and the signal holding circuit 420 outputs the Q output of the second flip-flop 423 as the corrected exposure-control signal Psc. The time period between t7 and t8 corresponds to the recording pixel P2 in FIG. 19(b), and the recording pixel P2 is not exposed as shown in FIG. 19(c) accordingly.

As described above, the signal holding circuit 420 temporarily holds the exposure-control signal Ps supplied from the total-sum processing circuit 328, and outputs the corrected exposure-control signal Psc after exchanging the signal levels between the recording pixels P1 and P2, thus efficiently eliminating the isolated points.

The second embodiment determines the isolated point based on the condition (f1) or (f2) and exchanges the results of exposure or non-exposure determination between the adjacent pixels. This reduces fluctuations of the halftone dot area and eliminates the isolated points around each halftone dot.

Incidentally, The modifications (1) through (5) of the first embodiment are also applicable to the second embodiment.

Although the above embodiments utilize dedicated hardware circuitry, the present invention can be also implemented by software programs.

According to the present invention described above, the total data Tex in each recording pixel is used as a basis of exposure or non-exposure determination for the recording pixel. The present method can thus determine exposure or non-exposure more accurately and precisely than the conventional method. Use of the total-sum data ΣTex allows comprehensive exposure or non-exposure determination over plural recording pixels disposed in the primary scanning direction. Even when the relative position of the address range of the screen pattern memory deviates against the coordinates of recording pixels, the method can efficiently eliminate the fluctuations in the number of pixels to be exposed. Consequently, undesirable fluctuations of the halftone dot area due to variation of the relative position can be eliminated.

Further, exposure or non-exposure of each recording pixel is easily determined by comparing the total-sum pixel data ΣTex with the number Nex at each recording pixel. Since a difference between the total-sum data ΣTex and the number Nex is carried over to the next recording pixel when the total-sum data ΣTex is not less than Nex, it is comprehensively judged whether or not to expose plural recording pixels disposed in the primary scanning direction.

Since the invention may be embodied in other forms without departing from the scope or spirit of essential characteristics thereof, it is clearly understood that the above embodiments are only illustrative and not restrictive in any sense. The spirit and scope of the present invention is limited only by the terms of the appended claims.

What is claimed is:

1. A method of generating halftone dots each consisting of a plurality of pixels as a function of a given image signal, comprising the steps of:
   (a) preparing a screen pattern memory for memorizing threshold values arranged in a predetermined matrix in a Cartesian X-Y coordinate system;
   (b) arranging pixels at lattice points in a Cartesian U-V coordinate system, said U and V denoting a primary scanning direction and a secondary scanning direction, respectively, said U-V coordinate system being set in predetermined relation to said X-Y coordinate system;
   (c) setting a predetermined number Nex of exposure-decision points for each pixel in said U-V coordinate system, said number Nex being an integer more than one; and
   (d) determining whether or not to expose each pixel, said step (d) including the steps of:
      (d-1) converting U-V coordinates of each of said number Nex of said exposure-decision points for each pixel to X-Y coordinates;
      (d-2) reading out said threshold values according to said X-Y coordinates of said number Nex of said exposure-decision points from said screen pattern memory;
      (d-3) comparing said threshold values for said number Nex of said exposure-decision points with said image signal to thereby produce a preliminary decision value indicating said result of said comparison at each of said exposure-decision points;
      (d-4) summing up said preliminary decision value over said number Nex of said exposure-decision points to make a total value for each pixel; and
      (d-5) accumulating said total value over a plurality of said pixels in said primary scanning direction U in order of scanning to thereby make a total-sum value for each pixel, and determining whether or not to expose each pixel according to said total-sum value.

2. A method in accordance with claim 1, wherein said exposure-decision points for each pixel include a central point of each pixel and at least one supplemental point, said central point and said supplemental point forming a lattice whose lattice lines are parallel to said primary scanning direction and said secondary scanning direction.

3. A method of generating halftone dots each consisting of a plurality of pixels as a function of a given image signal, comprising the steps of:
   (a) preparing a screen pattern memory for memorizing threshold values arranged in a predetermined matrix in a Cartesian X-Y coordinate system;
   (b) arranging pixels at lattice points in a Cartesian U-V coordinate system, said U and V denoting a primary scanning direction and a secondary scanning direction, respectively, said U-V coordinate system being set in predetermined relation to said X-Y coordinate system;
   (c) setting a predetermined number Nex of exposure-decision points for each pixel in said U-V coordinate system, said number Nex being an integer more than one; and
   (d) determining whether or not to expose each pixel, said step (d) including the steps of:
      (d-1) converting U-V coordinates of each of said number Nex of said exposure-decision points for each pixel to X-Y coordinates;
      (d-2) reading out said threshold values according to said X-Y coordinates of said number Nex of said exposure-decision points from said screen pattern memory;
      (d-3) comparing said threshold values for said number Nex of said exposure-decision points with said image signal and setting a preliminary decision value equal to one when said comparison indicates to expose a current pixel, and equal to zero when said comparison indicates not to expose said current pixel to thereby produce a preliminary decision value indicating said result of said comparison at each of said exposure-decision points;
      (d-4) summing up said preliminary decision value over said number Nex of said exposure-decision points to make a total value for each pixel; and
      (d-5) accumulating said total value over a plurality of said pixels in said primary scanning direction U in order of scanning to thereby make a total-sum value for each pixel, and determining whether or not to expose each pixel according to said total-sum value, said determining step including;
         determining to expose said current pixel and carrying over a value obtained by subtracting said number Nex from said total-sum value to a next pixel to be accumulated with said total value on condition that said total-sum value for said current pixel is no less than said number Nex; and
         determining not to expose said current pixel and carrying over said total-sum value to said next pixel to be accumulated with said total value on condition that said total-sum value for said current pixel is less than said number Nex.

4. A method in accordance with claim 3, wherein said step (d-5) further comprises the step of:
   carrying over a predetermined initial value to said next pixel to be accumulated with said total value on condition that said level of said image signal is less than fifty percent in halftone dot area rate and said said total value is equal to zero, said initial value being smaller than said number Nex; and
   carrying over said initial value to said next pixel to be accumulated with said total value on condition that said level of said image signal is no less than fifty percent in halftone dot area rate and said said total value is equal to said number Nex.

5. A method in accordance with claim 4, wherein said initial value is an integer between (Nex/2−1) and (Nex/2+1).

6. A method in accordance with claim 4, wherein said step (d-5) further comprises the step of:
   holding a result of determination of whether or not to expose a preceding pixel preceding said current pixel;

exchanging said results of said determination between said current pixel and said preceding pixel on condition that said level of said image signal is less than fifty percent in halftone dot area rate, and said said total value of said current pixel is an integer between a predetermined first reference value and one, and said said current pixel is determined to be exposed; and exchanging said results of said determination between said current pixel and said preceding pixel on condition that said level of said image signal is not less than fifty percent in halftone dot area rate, and said said total value of said current pixel is an integer between a predetermined second reference value and (Nex−1), and said said current pixel is determined not to be exposed.

7. A method in accordance with claim 3, wherein said step (d-5) further comprises the step of:

carrying over a predetermined initial value to a next pixel to be accumulated with said total value on condition that said level of said image signal is less than fifty percent in halftone dot area rate, and said at least one of X coordinate and Y coordinate of a predetermined representative point selected from said exposure-decision points exceeds a first value corresponding to an end of a halftone dot region, said initial value being smaller than said number Nex; and carrying over said initial value to said next pixel to be accumulated with said total value on condition that said level of said image signal is not less than fifty percent in halftone dot area rate, and said at least one of said X coordinate and said Y coordinate of said representative point exceeds a second value corresponding to said center of said halftone dot region.

8. A method in accordance with claim 7, wherein said initial value is an integer between (Nex/2−1) and (Nex/2+1).

9. A method in accordance with claim 7, wherein said step (d-5) further comprises the step of:

holding a result of determination of whether or not to expose a preceding pixel preceding said current pixel;

exchanging said results of said determination between said current pixel and said preceding pixel on condition that said level of said image signal is less than fifty percent in halftone dot area rate, and said said total value of said current pixel is an integer between a predetermined first reference value and one, and said said current pixel is determined to be exposed; and exchanging said results of said determination between said current pixel and said preceding pixel on condition that said level of said image signal is not I 5 less than fifty percent in halftone dot area rate, and said said total value of said current pixel is an integer between a predetermined second reference value and (Nex−1), and said said current pixel is determined not to be exposed.

10. An apparatus for generating halftone dots each consisting of a plurality of pixels arranged in a Cartesian U-V coordinate system as a function of a given image signal, said apparatus including a screen pattern memory for memorizing threshold values arranged in a predetermined matrix in a Cartesian X-Y coordinate system, said U and V denoting a primary scanning direction and a secondary scanning direction, respectively, said U-V coordinate system being set in predetermined relation to said X-Y coordinate system; said apparatus comprising:

conversion means for converting U-V coordinates of each of a predetermined number Nex of exposure-decision points to X-Y coordinates, said exposure-decision points being assigned to each pixel in said U-V coordinate system, said number Nex being an integer more than one;

reading means for reading out said threshold values according to said X-Y coordinates of said number Nex of said exposure-decision points from said screen pattern memory;

comparing means for comparing said threshold values for said number Nex of said exposure-decision points with said image signal to thereby produce a preliminary decision value indicating said result of said comparison at each of said exposure-decision points;

summation means for summing up said preliminary decision value over said number Nex of said exposure-decision points to make a total value for each pixel; and accumulation means for accumulating said total value over a plurality of said pixels in said primary scanning direction U in order of scanning to thereby make a total-sum value for each pixel, and determining whether or not to expose each pixel according to said total-sum value.

11. An apparatus in accordance with claim 10, wherein said exposure-decision points for each pixel include a central point of each pixel and at least one supplemental point, said central point and said supplemental point forming a lattice whose lattice lines are parallel to said primary scanning direction and said secondary scanning direction.

12. An apparatus for generating halftone dots each consisting of a plurality of pixels arranged in a Cartesian U-V coordinate system as a function of a given image signal, said apparatus including a screen pattern memory for memorizing threshold values arranged in a predetermined matrix in a Cartesian X-Y coordinate system, said U and V denoting a primary scanning direction and a secondary scanning direction, respectively, said U-V coordinate system being set in predetermined relation to said X-Y coordinate system; said apparatus comprising:

conversion means for converting U-V coordinates of each of a predetermined number Nex of exposure-decision points to X-Y coordinates, said exposure-decision points being assigned to each pixel in said U-V coordinate system, said number Nex being an integer more than one;

reading means for reading out said threshold values according to said X-Y coordinates of said number Nex of said exposure-decision points from said screen pattern memory;

comparing means for comparing said threshold values for said number Nex of said exposure-decision points with said image signal to thereby produce a preliminary decision value indicating said result of said comparison at each of said exposure-decision points;

summation means for summing up said preliminary decision value over said number Nex of said exposure-decision points to make a total value for each pixel; and accumulation means for accumulating said total value over a plurality of said pixels in said primary scanning direction U in order of scanning to thereby make a total-sum value for each pixel, and determining whether or not to expose each pixel according to said total-sum value, wherein said comparing means comprises:

means for setting said preliminary decision value equal to one when said comparison indicates to expose a current pixel, and equal to zero when said comparison indicates not to expose said current pixel; and said accumulation means comprises:

means for determining to expose said current pixel and carrying over a value obtained by subtracting said number Nex from said total-sum value to a next pixel to be accumulated with said total value on condition that said total-sum value for said current pixel is no less than said number Nex; and for determining not to expose said current pixel and carrying over said total-sum value to said next pixel to be accumulated with said total value on condition that said total-sum value for said current pixel is less than said number Nex.

13. An apparatus in accordance with claim 12, wherein said accumulation means further comprises:

means for carrying over a predetermined initial value to said next pixel to be accumulated with said total value on condition that said level of said image signal is less than fifty percent in halftone dot area rate and said said total value is equal to zero, said initial value being smaller than said number Nex; and for carrying over said initial value to said next pixel to be accumulated with said total value on condition that said level of said image signal is no less than fifty percent in halftone dot area rate and said said total value is equal to said number Nex.

14. An apparatus in accordance with claim 13, wherein said initial value is an integer between (Nex/2−1) and (Nex/2+1).

15. An apparatus in accordance with claim 13, wherein said accumulation means further comprises:

means for holding a result of determination of whether or not to expose a preceding pixel preceding said current pixel; and means for exchanging said results of said determination between said current pixel and said preceding pixel on condition that said level of said image signal is less than fifty percent in halftone dot area rate, and said said total value of said current pixel is an integer between a predetermined first reference value and one, and said said current pixel is determined to be exposed; and for exchanging said results of said determination between said current pixel and said preceding pixel on condition that said level of said image signal is not less than fifty percent in halftone dot area rate, and said said total value of said current pixel is an integer between a predetermined second reference value and (Nex−1), and said said current pixel is determined not to be exposed.

16. An apparatus in accordance with claim 12, wherein said accumulation means further comprises:

means for carrying over a predetermined initial value to a next pixel to be accumulated with said total value on condition that said level of said image signal is less than fifty percent in halftone dot area rate, and said at least one of X coordinate and Y coordinate of a predetermined representative point selected from said exposure-decision points exceeds a first value corresponding to an end of a halftone dot region, said initial value being smaller than said number Nex; and for carrying over said initial value to said next pixel to be accumulated with said total value on condition that said level of said image signal is not less than fifty percent in halftone dot area rate, and said at least one of said x coordinate and said Y coordinate of said representative point exceeds a second value corresponding to said center of said halftone dot region.

17. All apparatus in accordance with claim 16 wherein said initial value is an integer between (Nex/2−1) and (Nex/2+1).

18. An apparatus in accordance with claim 16, wherein said accumulation means further comprises:

means for holding a result of determination of whether or not to expose a preceding pixel preceding said current pixel; and means for exchanging said results of said determination between said current pixel and said preceding pixel on condition that said level of said image signal is less than fifty percent in halftone dot area rate, and said said total value of said current pixel is an integer between a predetermined first reference value and one, and said said current pixel is determined to be exposed; and for exchanging said results of said determination between said current pixel and said preceding pixel on condition that said level of said image signal is not less than fifty percent in halftone dot area rate, and said said total value of said current pixel is an integer between a predetermined second reference value and (Nex−1), and said said current pixel is determined not to be exposed.

* * * * *